(12) United States Patent
Dande et al.

(10) Patent No.: US 11,334,408 B2
(45) Date of Patent: *May 17, 2022

(54) BIG DATA DISTRIBUTED PROCESSING AND SECURE DATA TRANSFERRING WITH FAULT HANDLING

(71) Applicant: Bank of America Corporation, Charlotte, NC (US)

(72) Inventors: Pratap Dande, Saint Johns, FL (US); Gilberto Dos Santos, Jacksonville, FL (US); JayaBalaji Murugan, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 382 days.

This patent is subject to a terminal disclaimer.

(21) Appl. No.: 16/737,345

(22) Filed: Jan. 8, 2020

(65) Prior Publication Data

US 2021/0208960 A1 Jul. 8, 2021

(51) Int. Cl.
*H04L 29/06* (2006.01)
*G06F 11/07* (2006.01)
*G06F 21/14* (2013.01)
*G06F 21/62* (2013.01)
*H04L 9/14* (2006.01)
*G06F 21/64* (2013.01)

(52) U.S. Cl.
CPC .......... *G06F 11/0709* (2013.01); *G06F 21/14* (2013.01); *G06F 21/6227* (2013.01); *G06F 21/6254* (2013.01); *G06F 21/64* (2013.01); *H04L 9/14* (2013.01); *G06F 2221/2125* (2013.01); *G06F 2221/2141* (2013.01); *H04L 2209/16* (2013.01)

(58) Field of Classification Search
CPC .. G06F 21/6227; G06F 9/5016; G06F 9/5072; G06F 21/602
See application file for complete search history.

(56) References Cited

U.S. PATENT DOCUMENTS

| | | |
|---|---|---|
| 6,389,540 B1 | 5/2002 | Scheifler et al. |
| 7,487,395 B2 | 2/2009 | van Ingen et al. |
| 7,660,884 B2 | 2/2010 | Pu |
| 8,001,607 B2 | 8/2011 | Stull et al. |
| 8,185,620 B1 | 5/2012 | Boone et al. |

(Continued)

*Primary Examiner* — Shin-Hon (Eric) Chen
(74) *Attorney, Agent, or Firm* — Banner & Witcoff, Ltd.

(57) ABSTRACT

Aspects of the disclosure relate to resource allocation and rebating during in-flight data masking and on-demand encryption of big data on a network. Computer machine(s), cluster managers, nodes, and/or multilevel platforms can request, receive, and/or authenticate requests for a big data dataset, containing sensitive and non-sensitive data. Profiles can be auto provisioned, and access rights can be assigned. Server configuration and data connection properties can be defined. Secure connection(s) to the data store can be established. Sensitive information can be redacted into a sanitized dataset based on one or more data obfuscation types. Crashed executor(s) can be detected and caged to prevent further use. Uncompleted task(s) for crashed executor(s) can be reassigned. The encrypted data can be transmitted, in response to the request, to a source, a target, and/or another computer machine and can be decrypted back into the sanitized dataset.

20 Claims, 14 Drawing Sheets

(56) References Cited

U.S. PATENT DOCUMENTS

| | | | |
|---|---|---|---|
| 8,266,289 B2 | 9/2012 | Saha et al. | |
| 8,849,891 B1 | 9/2014 | Suchter et al. | |
| 9,223,995 B1 | 12/2015 | Lavinio | |
| 9,251,339 B2 | 2/2016 | Bullis et al. | |
| 9,298,878 B2 | 3/2016 | Guirguis et al. | |
| 9,311,194 B1 | 4/2016 | Cypher et al. | |
| 9,405,585 B2 | 8/2016 | Chess et al. | |
| 9,582,189 B2 | 2/2017 | Fuller et al. | |
| 9,716,692 B2 | 7/2017 | Cismas et al. | |
| 9,753,931 B2 | 9/2017 | Burshteyn | |
| 9,922,103 B2 | 3/2018 | Martens et al. | |
| 9,946,895 B1 | 4/2018 | Kruse et al. | |
| 10,037,330 B1 | 7/2018 | Burshteyn | |
| 10,110,424 B1 | 10/2018 | Sasi et al. | |
| 10,120,724 B2 | 11/2018 | Badjatia et al. | |
| 10,298,545 B2 | 5/2019 | Boivie et al. | |
| 10,630,468 B1* | 4/2020 | Wang | H04L 9/008 |
| 2011/0179011 A1* | 7/2011 | Cardno | G06F 30/00 |
| | | | 707/E17.108 |
| 2014/0136941 A1* | 5/2014 | Avrahami | G06F 21/6245 |
| | | | 715/229 |
| 2017/0104736 A1* | 4/2017 | Seul | H04L 67/10 |
| 2017/0316094 A1 | 11/2017 | Shekhar | |
| 2019/0065336 A1 | 2/2019 | Singhal et al. | |
| 2020/0019558 A1* | 1/2020 | Okorafor | G06F 21/6218 |
| 2020/0034565 A1* | 1/2020 | Kim | G06N 3/084 |
| 2020/0342128 A1* | 10/2020 | Moll | H04L 63/0428 |
| 2021/0064781 A1* | 3/2021 | Raphael | G06V 10/757 |
| 2021/0256159 A1* | 8/2021 | Ninglekhu | H04W 4/70 |

\* cited by examiner

Obfuscation Summary Report
900

Table Mapping
902

User ID
904

Obfuscation Percentage
906

FIG. 9

Data Processing Summary Report
1000

| Job ID |
| 1002 |

| Job No. |
| 1004 |

| Mapping Name |
| 1006 |

| From Cluster |
| 1008 |

| To Cluster |
| 1010 |

| Start Time |
| 1012 |

| End Time |
| 1014 |

| Total Rows |
| 1016 |

| User ID |
| 1018 |

| Service ID |
| 1020 |

FIG. 10

Data Forensics Report
1100

- Job ID 1102
- Job No. 1104
- Mapping Name 1106
- From Cluster 1108
- To Cluster 1110
- Start Time 1112
- End Time 1114
- Recent Data Size 1116
- Delta Load Size 1118
- CPU Snapshot 1120
- RAM Snapshot 1122
- Disk Snapshot 1124
- Reliability Factor 1126

FIG. 11

Resource Leakage Report
1200

Job ID
1202

Job No.
1204

Mapping Name
1206

From Cluster
1208

To Cluster
1210

Start Time
1212

End Time
1214

Crash Indicator
1216

Revival No.
1218

FIG. 12

BIG DATA DISTRIBUTED PROCESSING AND SECURE DATA TRANSFERRING WITH FAULT HANDLING

TECHNICAL FIELD OF DISCLOSURE

Aspects of the disclosure relate to processes and machines for electrical computers and digital processing systems with respect to distributed processing and secure multiple computer data transferring.

BACKGROUND

Prior art attempts to handle big data traditionally relate to Hadoop, which is a set of open source programs and procedures. Hadoop is essentially made up of four modules, each of which carries out a particular task essential for a computer system designed for big data analytics.

The most important modules are the Distributed File System, which allows data to be stored in an easily accessible format, across a large number of linked storage devices, and the MapReduce—which provides the basic tools for poking around in the data. A "file system" is the method used by a computer to store data, so it can be found and used. Normally this is determined by the computer's operating system, however a Hadoop system uses its own file system which sits "above" the file system of the host computer—meaning it can be accessed using any computer running any supported OS. MapReduce is named after the two basic operations this module carries out—reading data from the database, putting it into a format suitable for analysis (map), and performing mathematical operations such as, for example, counting the number of people aged 30+ in a customer database (reduce). The third module is Hadoop Common, which provides the tools (in Java) needed for the user's computer systems (Windows, Unix or other) to read data stored under the Hadoop file system. The final module is YARN (yet another resource negotiator), which manages resources of the systems storing the data and running the analysis. Various other procedures, libraries or features have come to be considered part of the Hadoop "framework" over recent years, but Hadoop Distributed File System, Hadoop MapReduce, Hadoop Common and Hadoop YARN are the principle four.

However, such prior art attempts at handling extremely large datasets with Hadoop are insufficient. For example, distributed processing requires configurable memory management. This is because the consumption of any particular dataset will be required to create distributed datasets. Although distributed datasets may fit in memory, many times problems such as OutOfMemoryError, high task launching costs, over burden and utilization in any of the orchestration services (a/k/a application managers) may be encountered with extremely large datasets. Keeping data in memory to ensure cost-efficient processing of big data means that resource consumption is often very high and can result in starvation.

Another issue is security with respect to data flowing from disparate sources and for distributed processing. Such data flow must be properly secured from potential insider and external threats.

Further, in any big data platform, data sanitization becomes a major risk to the information in external entities (and organized syndicates) out to break into any firewall protection by malicious insiders who have been granted access to the data. Every new data stream without obfuscation/masking of non-public personal information data (NPI) constitutes a new potential attack vector, which makes classic perimeter defenses obsolete and vulnerable. There is currently a lack of a production grade product/framework that provides data obfuscation in a platform independent manner. Deep insight is required since there may be little or no control over NPI data, which resides in production platforms and is incredibly sensitive.

Yet another problem in attempting to handle big data and distributed processing arises when tasks that are actively running on a node fail to complete or cached distributed datasets on a node are lost. This impacts performance drastically. Data flowing from disparate sources from interconnected systems might cause all relevant jobs to get stuck trying to recover and re-compute lost tasks and data, in some cases eventually crashing the entire job.

This disclosure addresses one or more of the shortcomings in the industry and provides improved performance and security when handling big data. This disclosure it not limited to Hadoop and, instead, pertains more broadly to distributed processing and secure multiple computer transferring of big data by "computer machines" and computer-executable "software and data" across "network(s)" as those terms are defined and used herein.

SUMMARY

Aspects of the disclosure provide effective, efficient, scalable, and convenient technical solutions that address and overcome the technical problems associated with handling big data such as, for example, by efficiently allocating and rebating resources such as RAM; obfuscating NPI data when transferring data and tasks from upper lanes (e.g., production platforms) and lower lanes (e.g., development platforms); isolating computers, clusters, nodes, cores, and/or executors that fail; efficiently transferring state information and tasks from failed computers, clusters, nodes and/or executors to others; providing fallback controller processes for detected faults; hyper fencing files on a network and uncompres sing them before distributing or assigning to one or more cores; and providing a variety of post process reports such as obfuscation summary reports, data processing summary reports, data forensics reports, and resource leakage reports.

In accordance with one or more embodiments, in-flight data masking and on-demand encryption of big data on a network can be performed. A computer machine, coupled to the network and containing computer-readable memory, can authenticate a request for a big data dataset based on credentials received from a source. The request can be stored in a sector of the computer-readable memory. The big data dataset can be stored in a data store coupled to the network. The big data dataset includes sensitive information and non-sensitive information. A profile can be auto provisioned corresponding to the request and stored in a sector of the computer-readable memory. Access rights for the request can be assigned based on the profile and stored in a sector of the computer-readable memory. Server configuration and data connection properties for the data store containing the big data dataset can be defined and stored in a sector of computer-readable memory. A secure connection from the computer machine to the data store can be established based on the server connection and the data connection properties. At least one multiple data obfuscation type stored in a sector of computer-readable memory can be registered. The big data dataset can be loaded from the data store on the network and stored in a sector of computer-readable memory. The big data dataset can be searched by the obfuscation computer machine, for the sensitive information to be redacted. The sensitive information in the big data dataset can be redacted into a sanitized dataset based on at least one multiple data obfuscation type and the non-sensitive information and the sanitized dataset can be stored in a sector of computer-readable memory. Redaction of the sensitive information in the big data dataset could be based on using a pre-defined mask, using random generation, and/or using regular expression obfuscation. If desired, regular expression obfuscation can be used to capture pattern values and replace the pattern values with a replacing value format. The sanitized dataset can be encrypted into encrypted data and stored in a sector of computer-readable memory. Data Lake encryption, a Base64 algorithm, a text-to-binary scheme, and/or any other form of desired encryption can be utilized. The encrypted data can be transmitted, in response to the request, to a source, a target, and/or another computer machine and can be decrypted back into the sanitized dataset.

In other embodiments, one or more non-transitory computer-readable media with computer-executable instructions stored thereon executed by one or more processors on a computer machine, communicatively coupled to a network, can be used to perform in-flight data masking and on-demand encryption of a big data dataset stored in a data store on the network. The big data dataset includes sensitive information and non-sensitive information. The computer-readable instructions can include: authentication instructions to authenticate a request for the big data dataset based on credentials received from a source; auto provision instructions to identify a profile corresponding to the request, the profile stored in a sector of the computer-readable medium; access instructions to assign access rights for the request based on the profile, the access rights stored in a sector of the computer-readable medium; server configuration and data connection instructions to define connection properties for the data store containing the big data dataset, the server configuration and data connection properties stored in a sector of the computer-readable medium; secure connection instructions to establish a secure connection from the obfuscation computer machine to the data store based on the server connection and the data connection properties; registration instructions to register at least one multiple data obfuscation type stored in a sector of the computer-readable medium; load instructions to load the big data dataset from the data store on the network into a sector of the computer-readable medium; search instructions to search the big data dataset for the sensitive information to be redacted; redaction instructions to redact into a sanitized dataset the sensitive information in the big data dataset based on the at least one multiple data obfuscation type and the non-sensitive information; storage instructions to store the sanitized dataset into a sector of the computer-readable medium; encryption instructions to encrypt the sanitized dataset into encrypted data, the encrypted data stored in a sector of the computer-readable medium; transmission instructions to transmit the encrypted data, in response to the request, to a source, a target, and/or another computer machine and can be decrypted back into the sanitized dataset.

In further embodiments, a multilevel computing platform for performing in-flight data masking and on-demand encryption of big data on a network can be utilized. A data store is coupled to the network and contains a big data dataset including sensitive information and non-sensitive information. Upper lane and lower lane platforms each respectively have: at least one processor, at least one communication interface communicatively coupled to the at least one processor and the network, and one or more computer-readable memories communicatively coupled to the communication interfaces, the computer-readable media storing computer-executable instructions that, when executed by the processors, cause platforms to perform various actions. For example, the upper lane platform can have and execute instructions to: authenticate a request for the big data dataset received via the upper communication interface from a lower lane platform; auto provision a profile corresponding to the request; assign access rights for the request based on the profile; define server configuration and data connection instructions for the data store containing the big data dataset; securely connect the upper platform to the data store via the upper communication interface based on the server configuration and the data connection instructions; register at least one multiple data obfuscation type; load the big data dataset from the data store into a sector in the computer-readable memory via the upper communication interface; search the big data dataset for the sensitive information to be redacted; redact into a sanitized dataset the sensitive information in the big data dataset based on said at least one multiple data obfuscation type and the non-sensitive information; store the sanitized dataset in a sector of the computer-readable memory; encrypt the sanitized dataset into encrypted data in a sector of the upper computer-readable memory; and transmit the encrypted data to the lower lane platform via the upper communication interface. Further, the lower lane platform can have and execute instructions to: transmit the request for the big data dataset via the lower communication interface to the upper platform; receive the encrypted data via the lower communication interface from the upper platform; store the encrypted data in a sector of the computer-readable memory; decrypt the encrypted data into the sanitized dataset; and store the sanitized dataset in a sector of its computer-readable medium.

In accordance with one or more embodiments, resource allocation and rebating during in-flight data masking and on-demand encryption of big data on a network can be implemented. A computer machine, coupled to the network and containing computer-readable memory, can authenticate a request for a big data dataset based on credentials received from a source. The request can be stored in a sector of the computer-readable memory. The big data dataset can be stored in a data store coupled to the network. The big data dataset includes sensitive information and non-sensitive information. A profile can be auto provisioned corresponding to the request and stored in a sector of the computer-readable memory. Access rights for the request can be assigned based on the profile and stored in a sector of the computer-readable memory. Server configuration and data connection properties for the data store containing the big data dataset can be defined and stored in a sector of computer-readable memory. A secure connection from the computer machine to the data store can be established based on the server connection and the data connection properties. At least one multiple data obfuscation type stored in a sector of computer-readable memory can be registered. The big data dataset can be loaded from the data store on the network and stored in a sector of computer-readable memory. The big data dataset can be searched by the computer machine, for the sensitive information to be redacted. The sensitive information in the big data dataset can be redacted into a sanitized dataset based on at least one multiple data obfuscation type and the non-sensitive information and the sanitized dataset can be stored in a sector of computer-readable memory. Redaction of the sensitive information in the big data dataset could be based on using a pre-defined mask, using random generation, and/or using regular expression obfuscation. If desired, regular expression obfuscation can be used to capture pattern values and replace the pattern values with a replacing value format. The computer machine's RAM requirements and current RAM allocation can be diagnosed. A portion of the current RAM allocation exceeding the RAM requirements can be rebated. The sanitized dataset can be encrypted into encrypted data and stored in a sector of computer-readable memory. Data Lake encryption, a Base64 algorithm, a text-to-binary scheme, and/or any other form of desired encryption can be utilized. The encrypted data can be transmitted, in response to the request, to a source, a target, and/or another computer machine and can be decrypted back into the sanitized dataset.

In some embodiments, available nodes, available cores, and available RAM in a cluster can be determined along with required nodes, required cores, and required RAM in the cluster. The required cores can be calculated to be a number of current tasks assigned per executor. A number of required executors can be calculated as the required cores per node divided by the required cores per executor, minus 1, multiplied by the available nodes.

In some embodiments, RAM overhead can be calculated as a percentage of maximum RAM multiplied by executor memory. RAM per executor can be calculated as the maximum RAM divided by the number of executors per node, minus the RAM overhead. A required memory per job and/or task(s) can be calculated.

In some embodiments, a namenode having a namenode memory can be read to determine a total namenode memory and an allocated namenode memory. Namenode heap memory and YARN memory can be determined.

In some embodiments, benchmark audit log(s) can be analyzed to determine storage memory and shuffle write per job modeling through a smart assist regression algorithm. The smart assist regression algorithm can a machine learning model used to predict an optimal RAM allocation and can be trained based on historical records.

In some embodiments, the optimal RAM allocation can be equal to the sum of a data size, a disk I/O, a storage, a cache memory, and a Java virtual machine memory.

In some embodiments, supplemental diagnosing and rebating for any incremental load of the big data dataset can be performed.

In other embodiments, one or more non-transitory computer-readable media with computer-executable instructions stored thereon executed by one or more processors on a computer machine, communicatively coupled to a network, can be used to perform resource allocation and rebating during in-flight data masking and on-demand encryption of a big data dataset stored in a data store on the network. The big data dataset includes sensitive information and non-sensitive information.

The computer-readable instructions can include: authentication instructions to authenticate a request for the big data dataset based on credentials received from a source, auto provision instructions to identify a profile corresponding to the request, the profile stored in a sector of the computer-readable medium; access instructions to assign access rights for the request based on the profile, the access rights stored in a sector of the computer-readable medium; server configuration and data connection instructions to define connection properties for the data store containing the big data dataset, the server configuration and data connection properties stored in a sector of the computer-readable medium; secure connection instructions to establish a secure connection from the obfuscation computer machine to the data store based on the server connection and the data connection properties; registration instructions to register at least one multiple data obfuscation type stored in a sector of the computer-readable medium; load instructions to load the big data dataset from the data store on the network into a sector of the computer-readable medium; search instructions to search the big data dataset for the sensitive information to be redacted; redaction instructions to redact into a sanitized dataset the sensitive information in the big data dataset based on said at least one multiple data obfuscation type and the non-sensitive information; diagnosing instructions to identify RAM requirements and a current RAM allocation; rebate instructions to rebate a portion of the current RAM allocation that exceeds the RAM requirements; storage instructions to store the sanitized dataset into a sector of the computer-readable medium; encryption instructions to encrypt the sanitized dataset into encrypted data, the encrypted data stored in a sector of the computer-readable medium; and transmission instructions to transmit the encrypted data, in response to the request, to a source, a target, and/or another computer machine and can be decrypted back into the sanitized dataset.

In further embodiments, a computing platform for performing resource allocation and rebating during in-flight data masking and on-demand encryption of big data on a network can be used. A data store can be coupled to the network and can contain a big data dataset including sensitive information and non-sensitive information. Computer machine(s) having at least one processor, at least one communication interface communicatively coupled to the at least one processor and the network, and one or more computer-readable media communicatively coupled to the at least one communication interface can be used. The computer-readable medium can store computer-executable instructions that, when executed by the processor(s), cause the computer machine(s) to: authenticate a request for the big data dataset based on credentials received from a source, auto provision a profile corresponding to the request, the profile stored in a sector of the computer-readable medium; assign access rights for the request based on the profile, the access rights stored in a sector of the computer-readable medium; define connection properties for the data store containing the big data dataset, the server configuration and data connection properties stored in a sector of the computer-readable medium; establish a secure connection from the computer machine to the data store based on the server connection and the data connection properties; register at least one multiple data obfuscation type stored in a sector of the computer-readable medium; load the big data dataset from the data store on the network into a sector of the computer-readable medium; search the big data dataset for the sensitive information to be redacted; redact into a sanitized dataset the sensitive information in the big data dataset based on the at least one multiple data obfuscation type and the non-sensitive information; identify RAM requirements and a current RAM allocation; rebate a portion of the current RAM allocation that exceeds the RAM requirements; store the sanitized dataset into a sector of the computer-readable medium; encrypt the sanitized dataset into encrypted data, the encrypted data stored in a sector of the computer-readable medium; and transmit the encrypted data, in response to the request, to a source, a target, and/or another computer machine and can be decrypted back into the sanitized dataset.

In accordance with one or more embodiments, a computing platform for handling faults during in-flight data masking and on-demand encryption of big data on a network can be used. A data store can be coupled to the network and can contain a big data dataset including sensitive information and non-sensitive information. One or more computer nodes and/or cluster manager(s) can have: processor(s) running set(s) of executors; communication interface(s) communicatively coupled to the processor(s) and the network, and one or more computer-readable media communicatively coupled to the communication interface(s), the computer-readable media storing computer-executable instructions that, when executed by the processor(s), cause one or more computer nodes to execute tasks in the set(s) of executors related to a request from a source for the big data dataset.

The cluster manager(s) can execute instructions to: store a broad list of available executors that include the set(s) of executors in the one or more computer node(s); manage the set(s) of executors in the computer node(s); receive the request for the big data dataset; assign one or more of the executors in the node(s) various task(s) relating to the request for the big data dataset; instruct that the sensitive information in the big data dataset be redacted to create a sanitized dataset that includes the redacted sensitive information and the non-sensitive information; detect crashed executor(s) and remove them from the broad list of available executors to create a reduced list of available executors such that the crashed executor is no longer used; determine any incomplete tasks assigned to the crashed executor; transfer the incomplete tasks to one or more of the executors in the reduced list of available executors; encrypt the sanitized dataset into encrypted data once all of said sensitive information has been redacted; and transmit the encrypted data to the source in response to the request, wherein the encrypted data can be transmitted, in response to the request, to a source, a target, and/or another computer machine and can be decrypted back into the sanitized dataset.

In some embodiments, the computer-readable media for the cluster manager(s) may also include instructions to: authenticate the request from the source for the big data dataset; auto provision a profile corresponding to the request; assign access rights for the request based on the profile; define server configuration and data connection instructions for the data store containing the big data dataset; securely connect the cluster computer machine to the data store via the cluster communication interface based on the server configuration and the data connection instructions; register at least one multiple data obfuscation type; load the big data dataset from the data store into the cluster computer-readable memory via the cluster communication interface; and distribute the big data dataset to one or more computer node(s).

In other embodiments, handling faults during in-flight data masking and on-demand encryption of big data on a network can be performed with a computer machine, coupled to the network and containing computer-readable memory, which can authenticate a request for a big data dataset based on credentials received from a source. The request can be stored in a sector of the computer-readable memory. The big data dataset can be stored in a data store coupled to the network. The big data dataset includes sensitive information and non-sensitive information. A profile can be auto provisioned corresponding to the request and stored in a sector of the computer-readable memory. Access rights for the request can be assigned based on the profile and stored in a sector of the computer-readable memory. Server configuration and data connection properties for the data store containing the big data dataset can be defined and stored in a sector of computer-readable memory. A secure connection from the computer machine to the data store can be established based on the server connection and the data connection properties. At least one multiple data obfuscation type stored in a sector of computer-readable memory can be registered. The big data dataset can be loaded from the data store on the network and stored in a sector of computer-readable memory. The big data dataset can be searched by the obfuscation computer machine, for the sensitive information to be redacted. The sensitive information in the big data dataset can be redacted into a sanitized dataset based on at least one multiple data obfuscation type and the non-sensitive information and the sanitized dataset can be stored in a sector of computer-readable memory. Redaction of the sensitive information in the big data dataset could be based on using a pre-defined mask, using random generation, and/or using regular expression obfuscation. If desired, regular expression obfuscation can be used to capture pattern values and replace the pattern values with a replacing value format. Crashed executor(s) the crashed during any processing of the big data dataset can be detected. The crashed executor(s) can be removed from the list of available executors to create a list of non-crashed executors, which can be stored in a sector of computer-readable memory. Any uncompleted task(s) assigned to the crashed executor(s) can be resubmitted to one or more of the other non-crashed executors either on the same node or another node. The sanitized dataset can be encrypted into encrypted data and stored in a sector of computer-readable memory. Data Lake encryption, a Base64 algorithm, a text-to-binary scheme, and/or any other form of desired encryption can be utilized. The encrypted data can be transmitted, in response to the request, to a source, a target, and/or another computer machine and can be decrypted back into the sanitized dataset.

In further embodiments, one or more non-transitory computer-readable medium or media with computer-executable instructions stored thereon executed by one or more processors on computer machine(s) for fault handling during in-flight data masking and on-demand encryption of a big data dataset stored in a data store on a network can be used. The big data dataset can include sensitive information and non-sensitive information. The computer machine(s) can be communicatively coupled to the network. Instructions on the one or more computer-readable media can include: authentication instructions to authenticate a request for the big data dataset based on credentials received from a source; auto provision instructions to identify a profile corresponding to the request, the profile stored in a sector of the computer-readable medium; access instructions to assign access rights for the request based on the profile, the access rights stored in a sector of the computer-readable medium; server configuration and data connection instructions to define connection properties for the data store containing the big data dataset, the server configuration and data connection properties stored in a sector of the computer-readable medium; secure connection instructions to establish a secure connection from the computer machine(s) to the data store based on the server connection and the data connection properties; registration instructions to register at least one multiple data obfuscation type stored in a sector of the computer-readable medium; load instructions to load the big data dataset from the data store on the network into a sector of the computer-readable medium; search instructions to search the big data dataset for the sensitive information to be redacted; redaction instructions to redact into a sanitized dataset the sensitive information in the big data dataset based on said at least one multiple data obfuscation type and the non-sensitive information; diagnosing instructions to identify RAM requirements and a current RAM allocation; rebate instructions to rebate a portion of the current RAM allocation that exceeds the RAM requirements; detection instructions to detect a crashed executor; remove instructions to remove the crashed executor from a broad list of available executors to create a reduced list of available executors such that the crashed executor is no longer used; identification instructions to identify any incomplete tasks assigned to the crashed executor; transfer instructions to transfer said incomplete tasks to an available executor in the reduced list of available executors; storage instructions to store the sanitized dataset into a sector of the computer-readable medium; encryption instructions to encrypt the sanitized dataset into encrypted data, said encrypted data stored in a sector of the computer-readable medium; and transmission instructions to transmit the encrypted data, in response to the request, to a source, a target, and/or another computer machine and can be decrypted back into the sanitized dataset.

In accordance with one or more embodiments, a computing platform for fallback control during in-flight data masking and on-demand encryption of big data on a network can be used. A data store can be coupled to the network and contain a big data dataset including sensitive information and non-sensitive information. One or more computer nodes and/or cluster manager(s) can have: processor(s) running set(s) of executors; communication interface(s) communicatively coupled to the processor(s) and the network, and one or more computer-readable media communicatively coupled to the communication interface(s), the computer-readable media storing computer-executable instructions that, when executed by the processor(s), cause one or more computer nodes to execute tasks in the set(s) of executors related to a request from a source for the big data dataset. The cluster manager(s) can execute instructions to: store a broad list of available executors that include the set(s) of executors in the one or more computer node(s); manage the set(s) of executors in the computer node(s); receive the request for the big data dataset; assign one or more of the executors in the node(s) various task(s) relating to the request for the big data dataset; instruct that the sensitive information in the big data dataset be redacted to create a sanitized dataset that includes the redacted sensitive information and the non-sensitive information; create a plurality of state points corresponding to safe state(s) progressively reached by executors after completion of task(s); progressively update state points and corresponding safe states as task(s) are completed; progressively revoke prior state points in order to maintain current state points and safe states; detect crashed executor(s) and remove them from the broad list of available executors to create a reduced list of available executors such that the crashed executor is no longer used; determine any incomplete tasks assigned to the crashed executor based on state points; transfer incomplete tasks to non-crashed executors in the same or a different node based on the latest safe state reached, whereby only an incomplete portion of the incomplete tasks is further processed; encrypt the sanitized dataset into encrypted data once all of said sensitive information has been redacted; and the encrypted data can be transmitted, in response to the request, to a source, a target, and/or another computer machine and can be decrypted back into the sanitized dataset.

In some embodiments, the computer-readable media for the cluster manager(s) may also include instructions to: authenticate the request from the source for the big data dataset; auto provision a profile corresponding to the request; assign access rights for the request based on the profile; define server configuration and data connection instructions for the data store containing the big data dataset; securely connect the cluster computer machine to the data store via the cluster communication interface based on the server configuration and the data connection instructions; register at least one multiple data obfuscation type; load the big data dataset from the data store into the cluster computer-readable memory via the cluster communication interface; and distribute the big data dataset to one or more computer node(s).

In further embodiments, fallback control during in-flight data masking and on-demand encryption of big data on a network can be implemented by authenticating, by computer machine(s), a request for a big data dataset based on credentials received from a source. The machine can be coupled to the network and contain computer-readable memory, which can include a list of executors available for processing the big data dataset, said list of available executors stored in a sector of the computer-readable memory. The request can be stored in a sector of the computer-readable memory. The big data dataset can be stored in a data store coupled to the network, said big data dataset including sensitive information and non-sensitive information. The computer machine(s) may: auto provision a profile corresponding to the request, said profile stored in a sector of the computer-readable memory; assigning access rights for the request based on the profile, said access rights stored in a sector of the computer-readable memory; define server configuration and data connection properties for the data store containing the big data dataset, said server configuration and said data connection properties stored in a sector of computer-readable memory; establishing a secure connection from the obfuscation computer machine to the data store based on the server connection and the data connection properties; register at least one multiple data obfuscation type stored in a sector of computer-readable memory; load into a sector of computer-readable memory, the big data dataset from the data store on the network; search the big data dataset for the sensitive information to be redacted; redact the sensitive information in the big data dataset based on said at least one multiple data obfuscation type and the non-sensitive information; store the sanitized dataset into a sector of computer-readable memory; progressively store last safe state points reached during processing of the big data dataset; detect crashed executor(s) that crashed during processing of the big data dataset; remove the crashed executor(s) from the list of available executors to create a list of non-crashed executors, the list of non-crashed executors stored in the computer-readable memory; resubmit one or more uncompleted portions of one or more incomple task(s) assigned to the crashed executor to one of said non-crashed executors either on the same node or on a different node, said uncompleted portion being determined by the last safe state point reached, whereby only the uncompleted portion needs to be further processed; encrypt the sanitized dataset into encrypted data, said encrypted data stored in a sector of computer-readable memory; and the encrypted data can be transmitted, in response to the request, to a source, a target, and/or another computer machine and can be decrypted back into the sanitized dataset.

In further embodiments, one or more non-transitory computer-readable media with computer-executable instructions stored thereon executed by one or more processor( )s on computer machine(s) can perform fallback control during in-flight data masking and on-demand encryption of a big data dataset stored in a data store on a network, the big data dataset including sensitive information and non-sensitive information, the computer machine(s) communicatively coupled to the network. The computer-readable media may include: authentication instructions to authenticate a request for the big data dataset based on credentials received from a source; auto provision instructions to identify a profile corresponding to the request, said profile stored in a sector of the computer-readable medium; access instructions to assign access rights for the request based on the profile, the access rights stored in a sector of the computer-readable medium; server configuration and data connection instructions to define connection properties for the data store containing the big data dataset, the server configuration and said data connection properties stored in a sector of the computer-readable medium; secure connection instructions to establish a secure connection from the computer machine to the data store based on the server connection and the data connection properties; registration instructions to register at least one multiple data obfuscation type stored in a sector of the computer-readable medium; load instructions to load the big data dataset from the data store on the network into a sector of the computer-readable medium; search instructions to search the big data dataset for the sensitive information to be redacted; redaction instructions to redact into a sanitized dataset the sensitive information in the big data dataset based on said at least one multiple data obfuscation type and the non-sensitive information; diagnosing instructions to identify RAM requirements and a current RAM allocation for the computer machine(s); rebate instructions to rebate a portion of the current RAM allocation that exceeds the RAM requirements for the computer machine(s); detection instructions to detect one or more crashed executor(s); remove instructions to remove the crashed executor(s) from a broad list of available executors to create a reduced list of available executors such that the crashed executor is no longer used; state point instructions to store recent safe states reached during processing; identification instructions to identify any incomplete tasks assigned to the crashed executor(s); incremental load instructions to identify any incomplete portion of any incomplete task based on the last safe state reached; transfer instructions to transfer the incomplete portion to an available executor in the reduced list of available executors, whereby only the incomplete portion of the incomplete task needs to be further processed; storage instructions to store the sanitized dataset into a sector of the computer-readable medium; encryption instructions to encrypt the sanitized dataset into encrypted data, said encrypted data stored in a sector of the computer-readable medium; and transmission instructions to transmit the encrypted data, in response to the request, to a source, a target, and/or another computer machine and can be decrypted back into the sanitized dataset.

In accordance with one or more embodiments, a multi-level computing platform for performing in-flight data masking and on-demand encryption of big data on a network can be utilized. A data store is coupled to the network and contains a big data dataset including sensitive information and non-sensitive information. The upper lane platform has a plurality of processors. The lower lane platform has at least one processor. Further, the upper lane and lower lane platforms each respectively have at least one communication interface communicatively coupled to the processors and the network, and a computer-readable memory communicatively coupled to the communication interfaces, the computer-readable media storing computer-executable instructions that, when executed by the processors, cause platforms to perform various actions. For example, the upper lane platform can have and execute instructions to: authenticate a request for the big data dataset received via the upper communication interface from a lower lane platform; auto provision a profile corresponding to the request; assign access rights for the request based on the profile; define server configuration and data connection instructions for the data store containing the big data dataset; securely connect the upper platform to the data store via the upper communication interface based on the server configuration and the data connection instructions; register at least one multiple data obfuscation type; load the big data dataset from the data store into a sector in the computer-readable memory via the upper communication interface; determine a compression codec applied to the big data dataset; uncompress the big data dataset into uncompressed data blocks based on the compression codec, said uncompressed data blocks stored in a sector in the computer-readable memory; distribute the uncompressed data blocks to the plurality of upper processors for sanitization; search the big data dataset for the sensitive information to be redacted; redact into a sanitized dataset the sensitive information in the big data dataset based on said at least one multiple data obfuscation type and the non-sensitive information; store the sanitized dataset in a sector of the computer-readable memory; encrypt the sanitized dataset into encrypted data in a sector of the upper computer-readable memory; and transmit the encrypted data to the lower lane platform via the upper communication interface. Further, the lower lane platform can have and execute instructions to: transmit the request for the big data dataset via the lower communication interface to the upper platform; receive the encrypted data via the lower communication interface from the upper platform; store the encrypted data in a sector of the computer-readable memory; decrypt the encrypted data into the sanitized dataset; and store the sanitized dataset in a sector of the computer-readable medium.

In some embodiments, the distribution of the uncompressed data blocks to the plurality of upper processors for sanitization can be performed by an orchestration service.

In some embodiments, the compression codec can be determined by reading a plurality of initial bytes of a file in the big data dataset.

In some embodiments, the compression codec can be Gzip, Bzip2, Snappy, or LZO.

In some embodiments, the uncompressed data blocks can be at least 128 MB.

In other embodiments, one or more non-transitory computer-readable media can have computer-executable instructions stored thereon executed by a plurality of processors on a computer machine communicatively coupled to a network can be used to perform in-flight data masking and on-demand encryption of a big data dataset stored in a data store on the network wherein the big data dataset includes sensitive information and non-sensitive information. The computer-executable instructions can include: authentication instructions to authenticate a request for the big data dataset based on credentials received from a source; auto provision instructions to identify a profile corresponding to the request, said profile stored in a sector of the computer-readable medium; access instructions to assign access rights for the request based on the profile, said access rights stored in a sector of the computer-readable medium; server configuration and data connection instructions to define connection properties for the data store containing the big data dataset, the server configuration and data connection properties stored in a sector of the computer-readable medium, secure connection instructions to establish a secure connection from the computer machine to the data store based on the server connection and the data connection properties; registration instructions to register at least one multiple data obfuscation type stored in a sector of the computer-readable medium; load instructions to load the big data dataset from the data store on the network into a sector of the computer-readable medium; codec instructions to determine a compression codec applied to the big data dataset; uncompress instructions to uncompress the big data dataset into uncompressed data blocks based on the compression codec, said uncompressed data blocks stored in a sector in the computer-readable memory; distribution instructions to distribute the uncompressed data blocks to the plurality of processors for sanitization; search instructions to search the big data dataset for the sensitive information to be redacted; redaction instructions to redact into a sanitized dataset the sensitive information in the big data dataset based on the at least one multiple data obfuscation type and the non-sensitive information; storage instructions to store the sanitized dataset into a sector of the computer-readable medium; encryption instructions to encrypt the sanitized dataset into encrypted data, said encrypted data stored in a sector of the computer-readable medium; and transmission instructions to transmit the encrypted data, in response to the request, to a source, a target, and/or another computer machine and can be decrypted back into the sanitized dataset.

In further embodiments, in-flight data masking and on-demand encryption of big data on a network can be performed by a computer machine that: is coupled to the network, has a plurality of processors, and contains computer-readable memory. A request for a big data dataset can be received and stored in a sector of the computer-readable memory. The big data dataset can be stored in a data store coupled to the network and can include sensitive information and non-sensitive information. One or more steps can be implemented to achieve the desired goals by: authenticating, by the computer machine, a request for a big data dataset based on credentials received from a source; auto provisioning, by the obfuscation computer machine, a profile corresponding to the request, said profile stored in a sector of the computer-readable memory; assigning, by the computer machine, access rights for the request based on the profile, said access rights stored in a sector of the computer-readable memory; defining, by the computer machine, server configuration and data connection properties for the data store containing the big data dataset, said server configuration and said data connection properties stored in a sector of computer-readable memory; establishing, by the computer machine, a secure connection from the obfuscation computer machine to the data store based on the server connection and the data connection properties; registering, by the computer machine, at least one multiple data obfuscation type stored in a sector of computer-readable memory; loading, by the computer machine into a sector of computer-readable memory, the big data dataset from the data store on the network; detecting, by the computer machine, a compression codec for the big data dataset; uncompressing, by the computer machine, the big data dataset into uncompressed data blocks based on the compression codec, said uncompressed data blocks stored in a sector in the computer-readable memory; distributing, by the computer machine, the uncompressed data blocks to said plurality of processors for sanitization; searching, by the computer machine, the big data dataset for the sensitive information to be redacted; redacting into a sanitized dataset, by the computer machine, the sensitive information in the big data dataset based on said at least one multiple data obfuscation type and the non-sensitive information; storing, by the computer machine into a sector of computer-readable memory, the sanitized dataset; encrypting, by the computer machine, the sanitized dataset into encrypted data, said encrypted data stored in a sector of computer-readable memory; and the encrypted data can be transmitted, in response to the request, to a source, a target, and/or another computer machine and can be decrypted back into the sanitized dataset.

In various embodiments, computer machine(s), obfuscation computer machine(s), node(s), cluster(s), and cluster manager(s) may be in either upper platform(s)/lane(s) or lower platform(s)/lane(s) in a multilevel computing environment. Similarly, the request for the big data dataset could originate from a source in the upper platform/lane or lower platform/lane. And, some or all of the functionality in one lane of the platform as opposed to the other lane of the platform could be switched as desired.

In various embodiments, redaction during in-flight data masking and on-demand encryption of big data on a network can be performed using a pre-defined mask, using random generation, and/or using regular expression obfuscation. If desired, the regular expression obfuscation can be used to capture pattern values and replace the pattern values with a replacing value format.

In various embodiments, encryption can be performed using Data Lake encryption, using a Base64 algorithm, using a text-to-binary scheme, and/or using any other desired encryption algorithm or method.

In various embodiments, safe state setpoint(s) can be set to keep track of one or more latest safe states reached during processing before detection of a crash such that only the incomplete portion of a task needs to be resubmitted and/or distributed for further processing, thereby obviating the need to completely re-execute a failed task. Setpoints and states may be progressively revoked as task(s) are successfully processed.

In various embodiments, fault handling algorithm(s) may be implemented and/or a fall back controller or fall back control can be used to stop in-memory batch processing if a fault occurs.

In various embodiments, all executors in a computer node may be removed from a broad list of available executors if any crashed executor is detected within the computer node. Alternatively, only the crashed executor could be removed from the broad list and the remaining non-crashed executors within the node can remain available for processing.

In various embodiments, a smart assist regression algorithm or other suitable algorithm can be used to predict an optimal RAM allocation. And, RAM in excess of the optimal allocation can be released.

In various embodiments, RAM requirements and a current RAM allocation for computer machine(s) can be diagnosed. And, portion(s) of the current RAM allocation that exceed the RAM requirements for the machine(s) can be rebated.

In various embodiments, resource allocation can be diagnosed, and RAM rebate(s) could be initiated as desired to optimize memory usage and performance.

In various embodiments, categories of data for obfuscation can be cataloged.

In various embodiments, one or more post processing reports can be generated and stored in a sector of computer-readable memory. Sample reports may include an obfuscation summary report, a data processing summary report, a data forensics report, and/or a resource leakage report. Combination or alternative reports may be generated as well.

Implementations of various aspects of this disclosure can vary depending on the preferences of system engineers and programmers, all of which would be within the knowledge of a person of ordinary skill in the art and could be implemented by such a person without undue experimentation by using custom and/or commercially available software. Although specific examples have been suggested for certain aspects of the disclosure, other implementations can be substituted without departing from the spirit of the invention contained in this disclosure and all are considered within the scope of the invention and claims.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 9, 10, 11, and 12 respectively depict sample post process reports such as an obfuscation summary report, a data processing summary report, a data forensics report, and a resource leakage report.

DETAILED DESCRIPTION

Figure 1A:
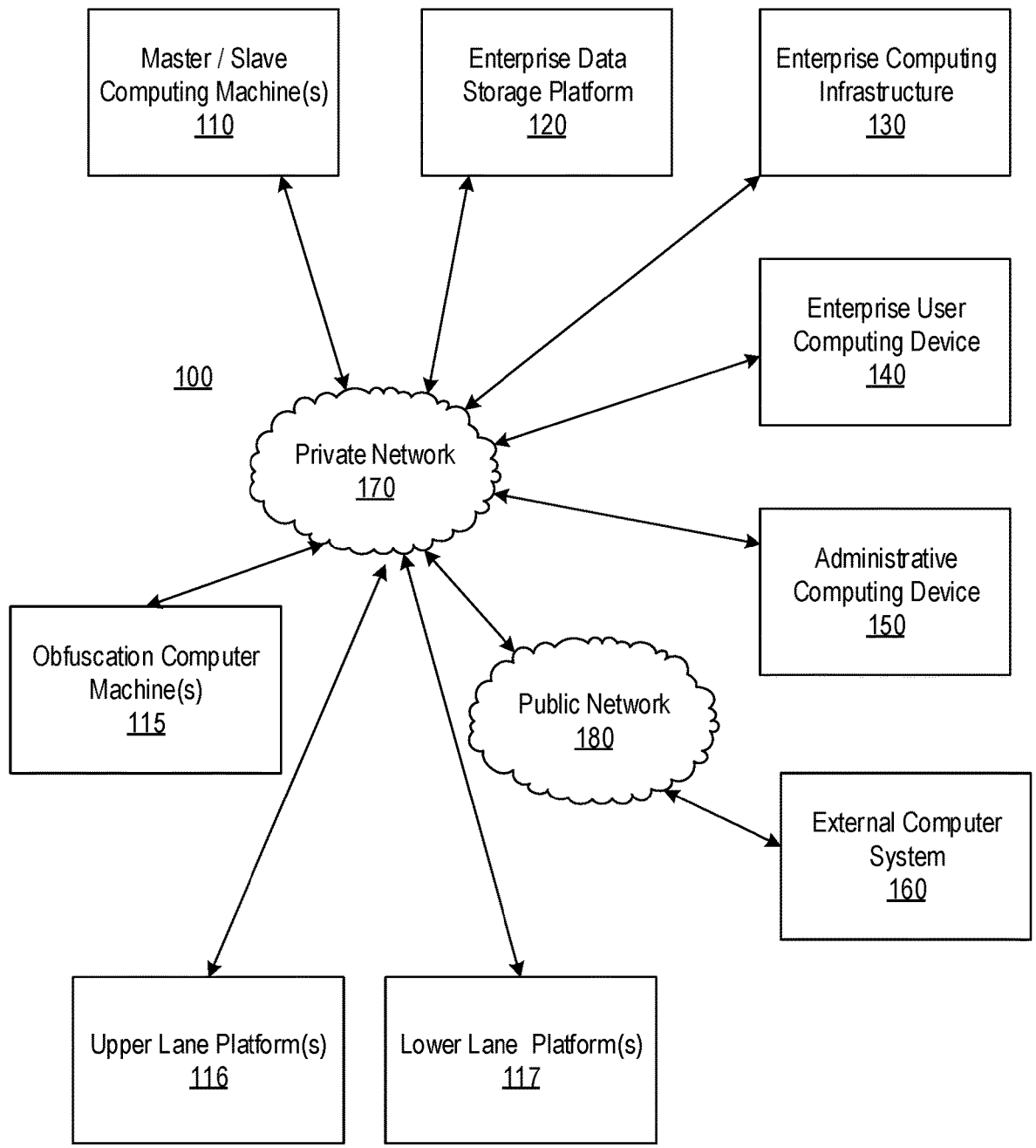
FIGS. 1A, 1B, and 1C depict an illustrative computing environment, in accordance with one or more environments, for handling big data by efficiently allocating and rebating resources such as RAM; obfuscating NPI data when transferring data and tasks from upper lanes and lower lanes; isolating computers, clusters, nodes, cores, and/or executors that fail; efficiently transferring state information and tasks from failed computers, clusters, nodes and/or executors to others in order to optimize completion of jobs and tasks without having to completely re-execute them again in the event of a fault; providing fallback controller processes for detected faults; and hyper fencing files on a network and uncompressing of them before distributing or assigning to one or more cores; and providing a variety of post process reports such as obfuscation summary reports, data processing summary reports, data forensics reports, and resource leakage reports.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As used throughout this disclosure, computer-executable "software and data" can include one or more: algorithms, applications, application program interfaces (APIs), attachments, big data, daemons, emails, encryptions, databases, datasets, drivers, data structures, file systems or distributed file systems, firmware, graphical user interfaces, images, instructions, machine learning, middleware, modules, objects, operating systems, processes, protocols, programs, scripts, tools, and utilities. The computer-executable software and data is on tangible, computer-readable memory (local, in network-attached storage, or remote), can be stored in volatile or non-volatile memory, and can operate autonomously, on-demand, on a schedule, and/or spontaneously.

"Computer machines" can include one or more: general-purpose or special-purpose network-accessible administrative computers, clusters, computing devices, computing platforms, desktop computers, distributed systems, enterprise computers, laptop or notebook computers, master computers, nodes, personal computers, portable electronic devices, servers, slave computers, smart devices, tablets, and/or workstations, which have one or more microprocessors or executors such as for executing or accessing the computer-executable software and data. References to computer machines and names of devices included within this definition are used interchangeably in this specification and are not considered to be limiting or exclusive to only a specific type of device. Instead, references in this disclosure to computer machines and the like are to be interpreted broadly as understood by skilled artisans. Further, as used in this specification, computer machines also include all hardware and components typically contained therein such as, for example, processors/executors/cores 111, volatile and non-volatile memories 112, communication interfaces 113, etc.

Volatile and non-volatile memories may be comprised of one or more computer-readable media containing a plurality of sectors. As used herein, a "sector" is broadly defined as subdivision(s) or block(s) of memory and is not limited to the minimum storage unit of a hard drive or other computer-readable medium. Further, the sector may have a fixed size or may be variable.

Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of any of the same. Networks also include associated "network equipment" such as access points, ethernet adaptors (physical and wireless), firewalls, hubs, modems, routers, and/or switches located inside the network and/or on its periphery, as well as software executing on any of the foregoing.

Figure 1B:
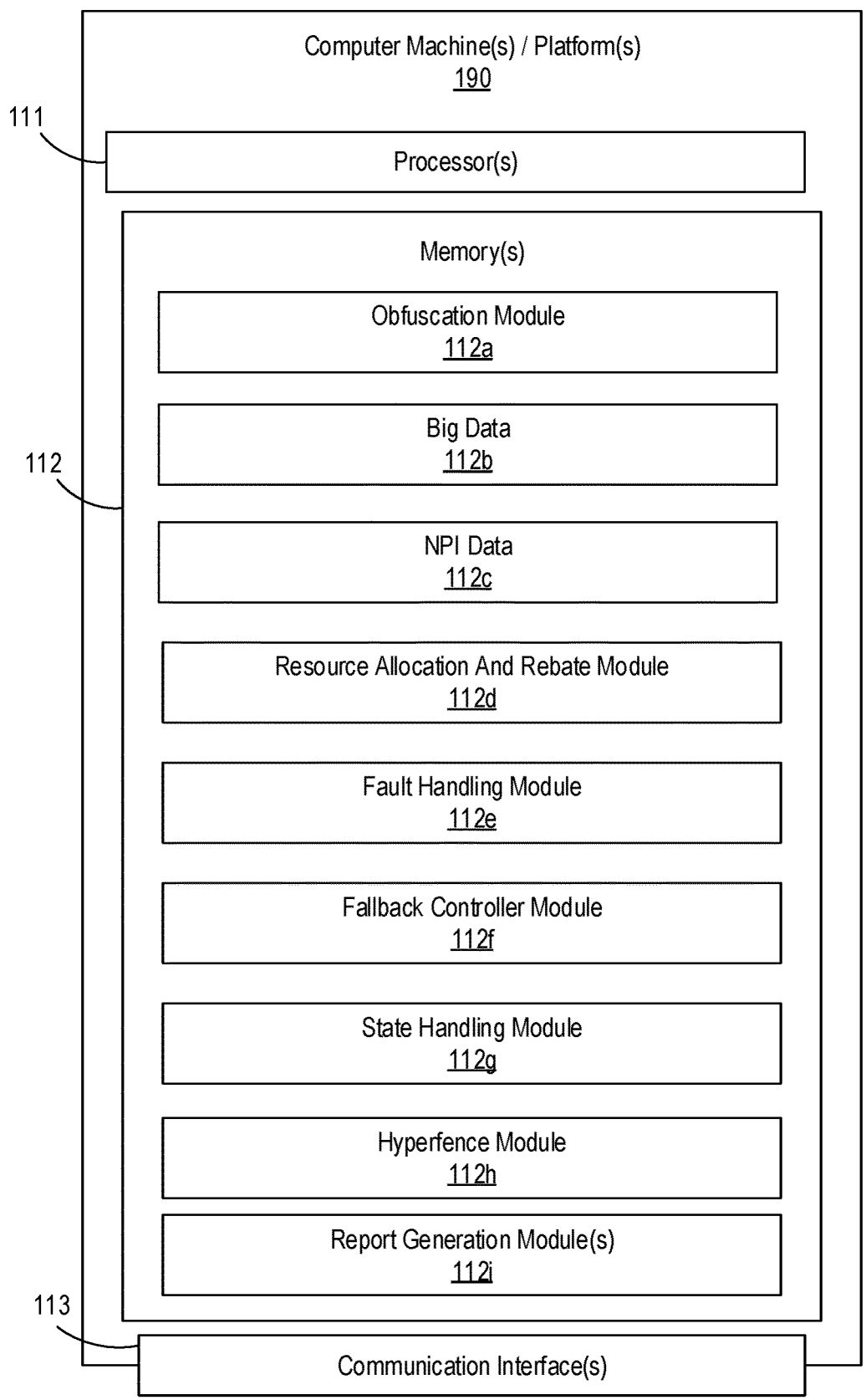
Figure 1C:
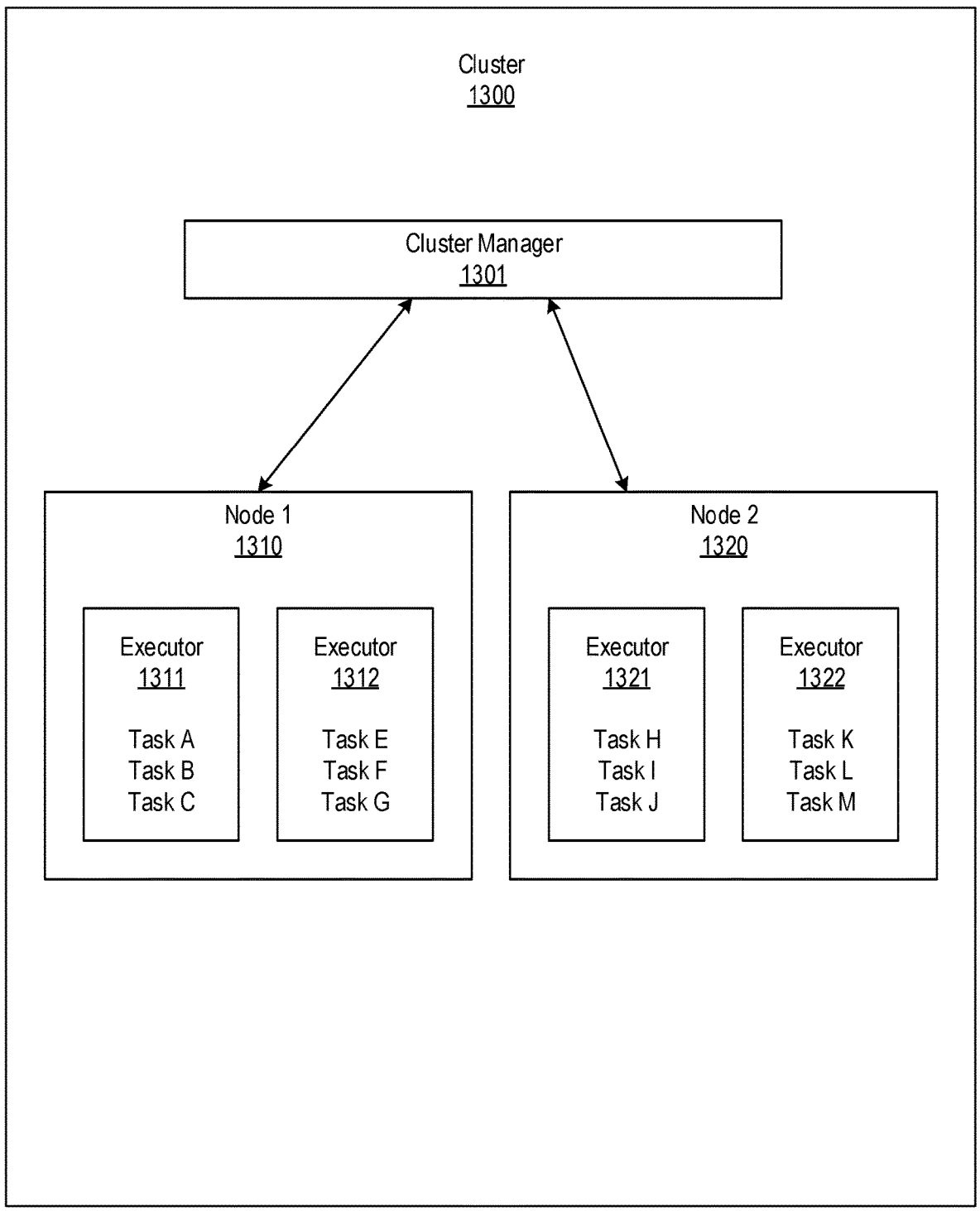

FIGS. 1A, 1B, and 1C depict illustrative sample computing environments, in accordance one or more example embodiments, for handling big data, efficiently allocating and rebating resources such as RAM, obfuscating NPI data when transferring data and tasks from upper lanes (e.g., production platforms) and lower lanes (e.g., development platforms), isolating computers or executors that fail, efficiently transferring state information and tasks from a failed computer or executor to another, providing fallback controller processes in event of faults, hyper fencing files on a network and uncompressing before distribution or assigning to one or more cores, and providing a variety of post process reports such as obfuscation summary reports, data processing summary reports, data forensics reports, and resource leakage reports.

Referring to FIG. 1A, computing environment 100 may include one or more computer machines or systems. For example, computing environment 100 may include various computer machines such as one or more masters and/or slaves 110 for distributed processing, obfuscation computer machine(s) 115, upper lane(s) 116 (e.g., production platforms), lower lane(s) 117 (e.g., development regions, system integration testing regions, user acceptance testing regions, application vulnerability testing regions, etc.), an enterprise data storage platform 120, enterprise computing infrastructure 130, an enterprise user computing machine 140, an administrative computing machine 150, and an enterprise computer system 160. As illustrated in greater detail below, each element in computing environment 100 may include one or more computing machines and associated components operating computer software and data configured to perform one or more of the functions described herein.

In addition, and as illustrated in greater detail below, master and slave computing machine(s) 110, obfuscation computer machine(s) 115, upper lane(s) 116, and/or lower lane(s) 117, may be configured to perform various distributed processing functions described herein as well as store, access, and/or act on enterprise data. Enterprise computing infrastructure 130 may include one or more computer machines and/or other computer components. In addition, and as illustrated in greater detail below, enterprise computing infrastructure 130 may be configured to provide various enterprise and/or back-office computing functions for an organization, such as a financial institution. For example, enterprise computing infrastructure 130 may include various computer machines and/or computer-executable software and that store and/or otherwise contain account information, such as financial account information including account balances, transaction history, account owner information, and/or other information. In addition, enterprise computing infrastructure 130 may process and/or otherwise execute transactions on specific accounts based on commands and/or other information received from other computer systems included in computing environment 100. Additionally or alternatively, enterprise computing infrastructure 130 may load data from enterprise data storage platform 120, manipulate and/or otherwise process such data, and return modified data and/or other data to enterprise data storage platform 120 and/or to other computer machines or systems included in computing environment 100.

Enterprise user computing device 140 may be any type of computer machine and may be linked to and/or used by a specific enterprise user (who may, e.g., be an employee or other affiliate of an enterprise organization controlling and/or interacting with master and slave computing device(s) 110). Administrative computing device 150 may be any type of computer machine and may be linked to and/or used by an administrative user (who may, e.g., be a network administrator of an enterprise organization controlling and/or interacting with master and slave computing device(s) 110). Enterprise computer system 160 may be any type of computer machine and may be linked to and/or used by one or more external users (who may, e.g., not be associated with an enterprise organization controlling and/or interacting with master and slave computing device(s) 110).

Computing environment 100 also may include one or more networks, which may interconnect one or more of master and slave computer machine(s) 110, obfuscation computer machine(s) 115, upper lane(s) 116, and/or lower lane(s) 117, enterprise data storage platform 120, enterprise computing infrastructure 130, enterprise user computing device 140, administrative computing device 150, and enterprise computer system 160. For example, computing environment 100 may include a private network 170 (which may, e.g., interconnect master and slave computer machine(s) 110, obfuscation computer machine(s) 115, upper lane(s) 116, and/or lower lane(s) 117, enterprise data storage platform 120, enterprise computing infrastructure 130, enterprise user computing device 140, administrative computing device 150, and/or one or more other computer machines or systems, which may be associated with an organization, such as a financial institution), and public network 180 (which may, e.g., interconnect enterprise computer system 160 with private network 170 and/or one or more other computer machines, systems, public networks, sub-networks, and/or the like).

In one or more arrangements, computer machines and the other systems included in computing environment 100 may be any type of computing device capable of providing a user interface, receiving input via the user interface, acting on the input, accessing or processing big data, controlling other computer machines and/or components thereof based on the input, and communicating the received input to one or more other computing machines. As noted above, and as illustrated in greater detail below, any and/or all of the computer machines of computer environment 100 may, in some instances, be special-purpose computing devices configured to perform specific functions.

Referring to FIG. 1B, one or more computer machines or platforms 190, such as, for example, any of those identified in FIG. 1A, may include one or more processors 111, memory 112, and communication interface 113. A data bus may interconnect processor 111, memory 112, and communication interface 113. Communication interface 113 may be a network interface configured to support communication between one or more computer machines in computer environment 100 and one or more networks (e.g., private network 170, public network 180, or the like). Memory 112 may be volatile or non-volatile, and may include computer software and data such as, for example, one or more program modules having instructions that when executed by processor 111 cause a computer machine, such as master and/or slave computer machine(s) 110, obfuscation computer machine(s) 115, upper lane(s) 116, and/or lower lane(s) 117, to perform one or more functions described herein and/or one or more databases or other distributed file systems that may store and/or otherwise maintain information which may be used by such program modules and/or processor 111. In some instances, one or more program modules and/or databases may be stored by and/or maintained in different memory units (local or accessible across the network) of computer machine 190 and/or by different computing devices that may form and/or otherwise make up a collection of computer machines. For example, memory 112 may have, store, and/or include a obfuscation module 112a, big data or distributed file systems 112b, NPI data 112c, a resource allocation and rebate module 112d, a fault handling module 112e, a fallback controller module 112f, a state handling module 112g, a hyper fence module 112h, and one or more report generation modules 112i.

In some embodiments, obfuscation module 112a may be an adaptive application that performs in-flight data masking and on-demand data lake encryption, which facilitates scalability and failover. It can be deployed in a single-tier or two-tier architecture and can be self-contained. It can perform extraction, obfuscation, and loading from disparate sources of big data, databases, and legacy relational databases. Multiple obfuscation techniques can be deployed and managed by different services implementing a distributed algorithm with an agent's controller/services that directs endpoint functionality, catalogs locations of sensitive NPI data, and tracks masked data jobs. Obfuscation module 112*a* may utilize different obfuscation techniques that are used in multi-structures embedded redacting, and may include encryption, predefined masks, random generation, and regular expression. Encryption may be through a Base64 algorithm or other as desired. Encryption text-to-binary schemes may be used to maintain referential integrity such as with a foreign key. Predefined masks are masks provided with the application in order to expedite the obfuscation process with common obfuscation cases. Random generation is an obfuscation method to randomly generate values from any of the predefined mask categories, or to create random values based on data types. Regular expression obfuscation is used to capture patterns in values and replace them with a replacing value format that can be set by the user, administrator, or programmer in a replacing value format field.

The agent's controller refers to any type of orchestration service that can coordinate processes in an application manager. Cataloging can denote a list of various NPI data that may be contained in tables or other configurations in the software and data, which are ready for obfuscation. This need not be a separate silo process and, instead, can be part of masking rules or obfuscator types, and the jobs can be tracked by process IDs.

Other modules such as, for example, resource allocation and rebate module 112*d*, fault handling module 112*e*, a fallback controller module 112*f*, a state handling module 112*g*, hyper fence module 112*h*, and report generation modules 112*i* are described in more detail below in reference to other figures.

Figure 2:
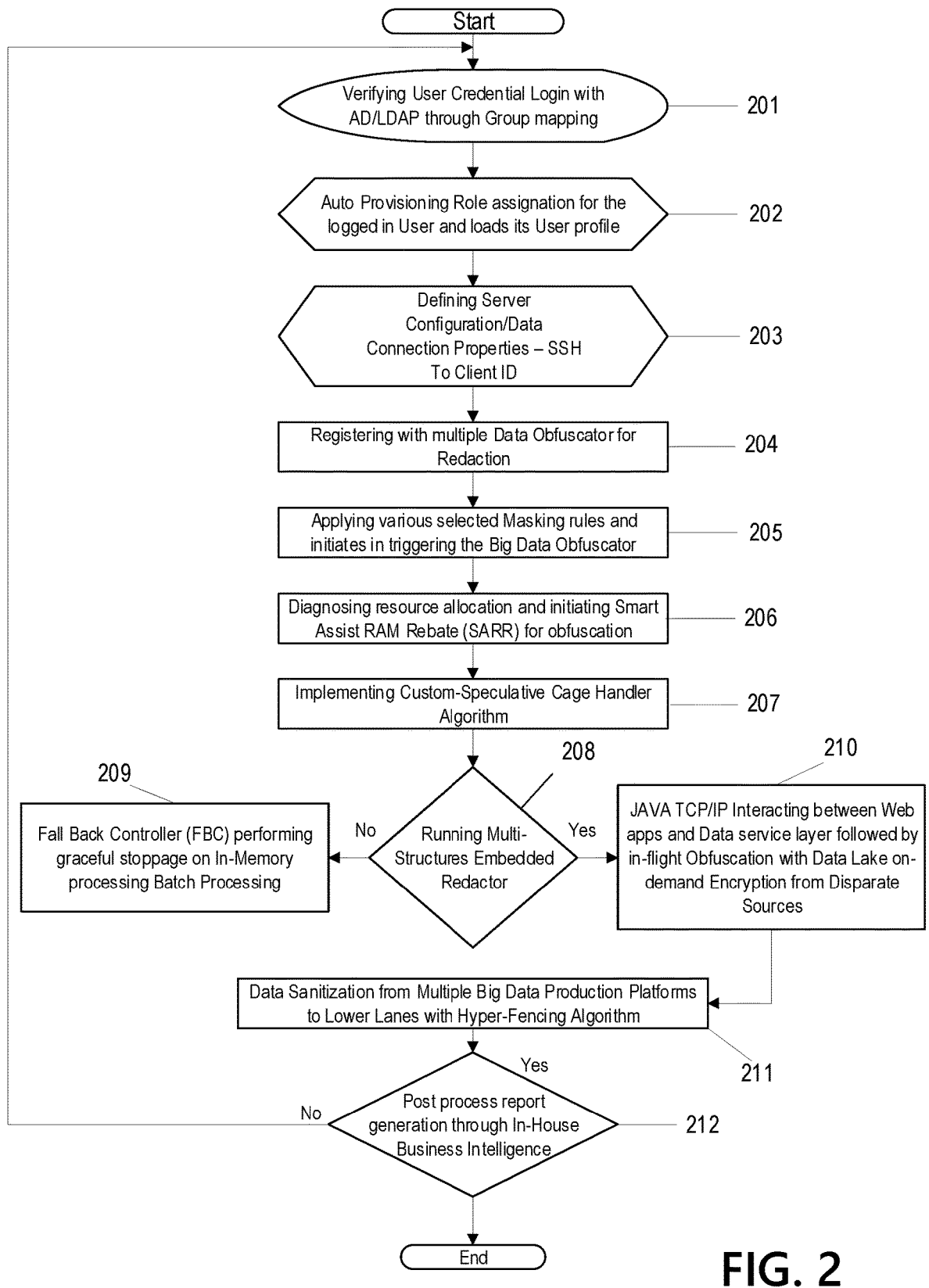
FIG. 2 depicts an illustrative method for big data obfuscating in accordance with one or more example embodiments.

FIG. 2 depicts an illustrative method for big data obfuscating in accordance with one or more example embodiments. In some embodiments, a user can login and provide credentials via one or more various protocols such as, for example, active directory (AD) or lightweight directory access protocol (LDAP) in step 201. In step 202, an auto provisioning role for the logged in user is assigned and a user profile can be loaded. This can identify a group to which the user belongs (e.g., administrator, standard user, etc.) and the level of access that can be granted within the application based on the rights available to members of the assigned group.

In step 203, server configuration and data connection properties are defined. Data connection properties can be used to establish a connection to one or more applicable databases, data stores, and/or distributed file systems. Sample fields for connecting can include: a connection name (to name the connection for setup), a database (to define the database name), and a server configuration (to define a server network location, port address, etc.). Secure Shell or Secure Socket Shell (i.e., SSH) cryptographic hashing can be used to provide security.

In step 204, registration is performed with a multiple data obfuscator for redaction. Here, the application provides support to register multiple data obfuscation types such as on-demand encryption through Base64 and/or an encryption text-to-binary scheme that maintains referential integrity, random generation of characters for replacement, predefined masking for popular categories such as names, addresses, or credit cards, and regular expressions to define masking of data for typical circumstances.

In step 205, one or more various selected masking rules can be applied and obfuscation of NPI in big data can be triggered. As referenced previously, NPI (e.g., social security numbers, personal banking account numbers, personal transactions etc.) is highly confidential and cannot be shared with the public or in lower lane development and can be masked by the above-mentioned masking rules or the obfuscation types. One-way masking can be applied when copying from an upper lane production environment to a lower lane development environment where unmasking the data is not necessary. Unmasking can also be supported by different methodologies to transform the masked data back into its original format. Determinations can be catalogued for column level selections in data tables based on a user's choice and obfuscation can be applied on the fly towards the lower environment.

In some embodiments, step 206 can diagnose resource allocations and initiate resource rebates for obfuscation such as, for example, by a smart assist RAM rebate (SARR). A more detailed explanation of sample resource allocations and rebates is explained later in this disclosure.

In some embodiments, step 207 can implement a custom-speculative cage handler and/or other fault handling and isolation algorithm to detect faults, isolate faults, and transfer prosecution of tasks from one executor to another executor in the cluster.

As illustrated in FIG. 1C, executor(s) 1311, 1312, 1321, 1322, are one or more processes launched for an application on a worker node 1310, 1320, that runs tasks (e.g., Tasks A-M) and keeps data in memory or disk storage across them. A computer cluster 1300 is a set of loosely or tightly connected computers that work together so that, in many respects, they can be viewed as a single system. Unlike grid computers, computer clusters have each node set to perform various tasks, controlled and scheduled by software, such as a cluster manager 1301. A node is a device or data point in a larger network.

Tasks to be transferred can be transferred from a safe state point such that the entire task does not need to be re-executed from the beginning and only the remaining items to be performed in the task need to be transferred to an operable executor within the same or adjacent node in the cluster. A more detailed explanation of various embodiments of sample fault handling is provided below in reference to other figures.

In step 208, a multi-structures embedded redactor is running and monitoring the progress of various jobs or tasks at frequent intervals such as, for example, every 10 milliseconds. The timing and monitoring may be controlled by applicable scripts.

If a job fails to complete, then, in step 209, a fall back controller can perform a graceful and safe stoppage on in-memory processing of a batch process. A more detailed explanation of various embodiments of sample fall back controlling is provided below in reference to other figures.

Otherwise, in step 210, obfuscation is performed through the usage of one or more various Java APIs or the like. Data can be distributed in blocks across partitions and split into clusters while computing. And, for each column level a masking rule or obfuscator type can be applied over the corresponding values when migrated from a source location to a target location. In-flight obfuscation with Data Lake on-demand encryption from disparate sources may be used. In this context, Data Lake means that, unlike purpose-built data stores and database management systems, data may be dumped in its original format, may be unmanaged, and may be available to one or more individuals across an enterprise.

In step 211, data is sanitized from multiple big data production platforms to lower lanes. This refers to accessing the production environment, establishing a connection to the relevant database tables for extraction, and registering with defined obfuscation methods over the column level data from the source location. The multi-structures embedded redactor is triggered to obfuscate the selected data and transfer it to lower lane environments. This can be accomplished through hyper fencing, which is describe in detail below with respect to other figures.

In step 212, post process reports can be generated such as illustrated in FIGS. 9, 10, 11, and 12. As shown in FIG. 9, an obfuscation summary report 900 can display the percentage of columns obfuscated by a particular table mapping or obfuscation type, and can include details such as: table mapping (the name of the table mapping) 902, User ID (the user who creates the table mapping) 904, and obfuscation percentage (the percentage of columns being obfuscated per table mapping definition) 906.

In addition or alternatively, as shown in FIG. 10, a data processing summary report 1000 can display the results from a data processing job and its details such as: Job Id—for tracking purposes 1002, the generated job identification number for the obfuscation job 1004; Mapping Name—the mapping definition of each column registering with obfuscator types or masking rules 1006; From Cluster—the source cluster 1008; To Cluster—the target cluster 1010; Starting Time—the time and date the obfuscation job was started 1012; End Time—the time and date the obfuscation job ended 1014; Total Rows—the total number of rows that were processed in the obfuscation job 1016; User Id—the user who started the obfuscation job 1018; and/or Service Id—the Service ID correlated with the user who ran the obfuscation job 1020. If successful, the process can end. Otherwise, the process can be repeated in whole or in part by returning to step 201.

In addition or alternatively, as shown in FIG. 11, a data forensics report 1100 can display forensic details such as Job Id—for tracking purposes 1102, the generated job identification number for the obfuscation job 1104, the Mapping Name—the mapping definition of each column registering with obfuscator types or masking rules 1106, From Cluster—the source cluster 1108, To Cluster—the target cluster 1110, Starting Time—the time and date the obfuscation job was started 1112, End Time—the time and date the obfuscation job ended 1114, Recent Data Size—the data size captured that had been migrated from the previous activity 1116, Delta Load Size—the incremental data size captured for process submission(s) 1118, CPU Snapshot—captures CPU statistics involved in the process for recent data migration 1120, RAM Snapshot—captures RAM statistics involved in the process for recent data migration 1122, Disk Snapshot—captures disk statistics involved in the process for recent data migration 1124, and Reliability Factor—factor resembles by denoting number of times the same migration got triggered by any user 1126.

In addition or alternatively, as shown in FIG. 12, a resource leakage report 1200 can include a Job Id—for tracking purposes 1202, Job No.—the generated job identification number for the obfuscation job 1204, Mapping Name—the mapping definition of each column registering with obfuscator types or masking rules 1206, From Cluster—the source cluster 1208, To Cluster—the target cluster 1210, Starting Time—the time and date the obfuscation job was started 1212, End Time—the time and date the obfuscation job ended 1214, Crash Indicator—indicator(s) that represent number of crashes occurred in the job 1216, and a Revival No.—number of revivals offered for new executors added in the job.

Figure 3:
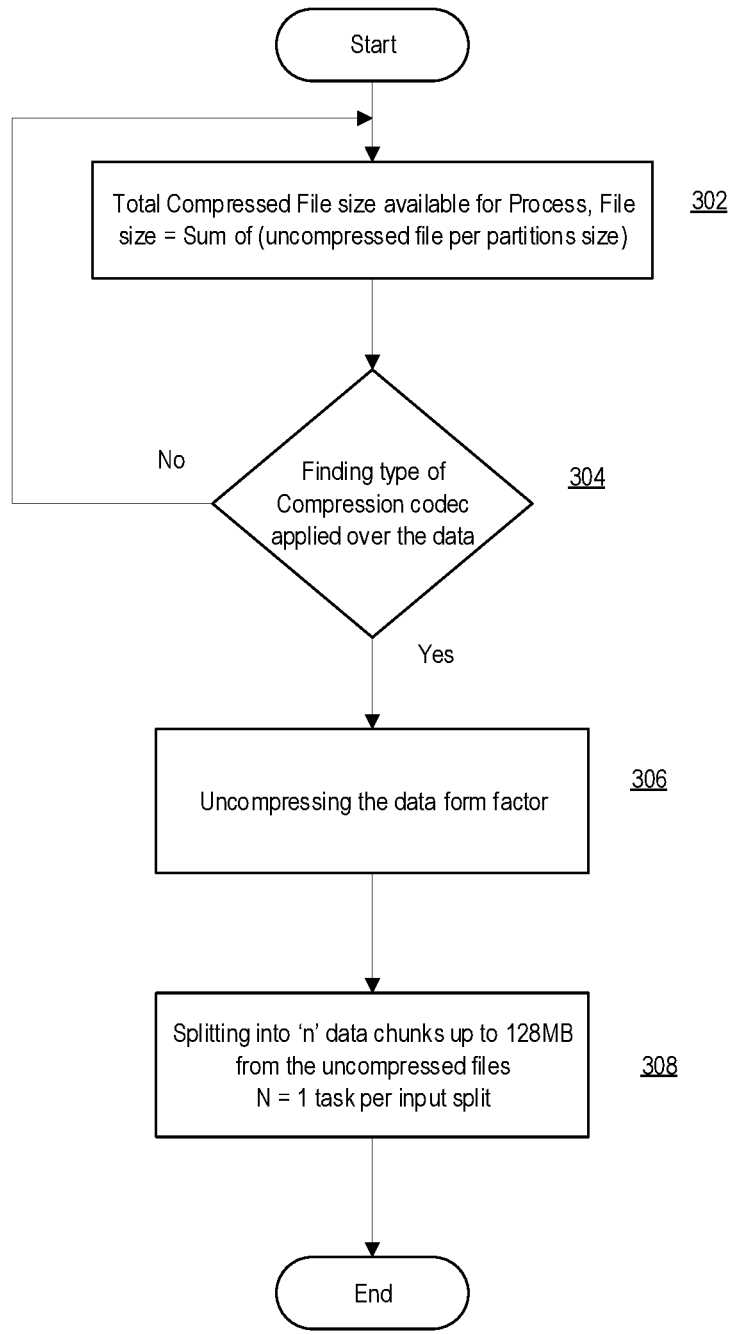
FIG. 3 depicts an illustrative method for hyper fencing in accordance with one or more example embodiments.

FIG. 3 depicts an illustrative method for hyper fencing in accordance with one or more example embodiments. This can determine the in-memory processing framework to hyper fence any type of files on network and uncompress them before sending to any single core, other component, or other computer machine. A processor core (or simply "core") is an individual processor within a CPU. Many computers today have multi-core processors, meaning the CPU contains more than one core.

Hyper fencing refers to halting files entering into cores or the like for processing and initial decompression for each individual tiny file. The algorithm can initiate an API call, which involves methods or functions such as FileInputStream, FileOutputStream and InflaterInputStream to decompress the files. Distribution of data blocks to individual cores can be performed through an orchestration service, which handles processing of jobs. This solves the problem of large spans of time being wasted in cores or the like by unzipping files in sequence if the input data files are in multiple fragments to avoid the resultant cached distributed datasets with multiple tiny partitions. Data is distributed in blocks across partitions and split in the cluster while computing. Masking rules or obfuscator types can be applied on a column level or the like over corresponding values when migrated from a source location to a target location. Input files can be of any type and structure as they may originate from disparate sources. If the input file is found to be with multiple fragments or many tiny files internally, then, processing may result in heavy utilizing of the cores or the like. This is time consuming in distributed cluster computing and is a performance penalty.

In step 302, the total compressed file size available for a process can be determined. The file size can be the sum of uncompressed files per partition sizes. In step 304, the type of compression codec applied over the data can be determined. The type of compression codec can be determined by reading the first few bytes of the file or by using an operating system utility to identify the compression codec for instance: "file" Command "file tmp.txt.gz" in Linux environments to determine the compression codec. In big data, the following are the most commonly used codecs: Gzip (a compression utility that was adopted by the GNU project); Gzip (short for GNU zip, generates compressed files that have a .gz extension, the gunzip command is also used to decompress files that were created by a number of compression utilities, including Gzip); Bzip2 (from a usability standpoint, Bzip2 and Gzip are similar, Bzip2 generates a better compression ratio than does Gzip, but it is much slower); Snappy (this codec from Google provides modest compression ratios, but fast compression and decompression speeds and, in fact, it has the fastest decompression speeds, which makes it highly desirable for data sets that are likely to be queried often); and LZO (similar to Snappy, LZO provides modest compression ratios, but fast compression and decompression speeds).

If successfully identified, the data form factor can be uncompressed in step 306. Otherwise, the process or a modified version thereof can be repeated in step 302. The uncompressed file can be split into any number ("n") blocks up to an arbitrary limit such as, for example, 128 MB. One task could be assigned for each input split. In any cluster, computing data can be segregated into small chunks known as data blocks. Data blocks can be the smallest unit of data in an underlying file system. Since the underlying file system stores files as blocks with a minimum size as per a standard, this can be the defined block size or data chunk involved in the cluster computing.

Figure 4:
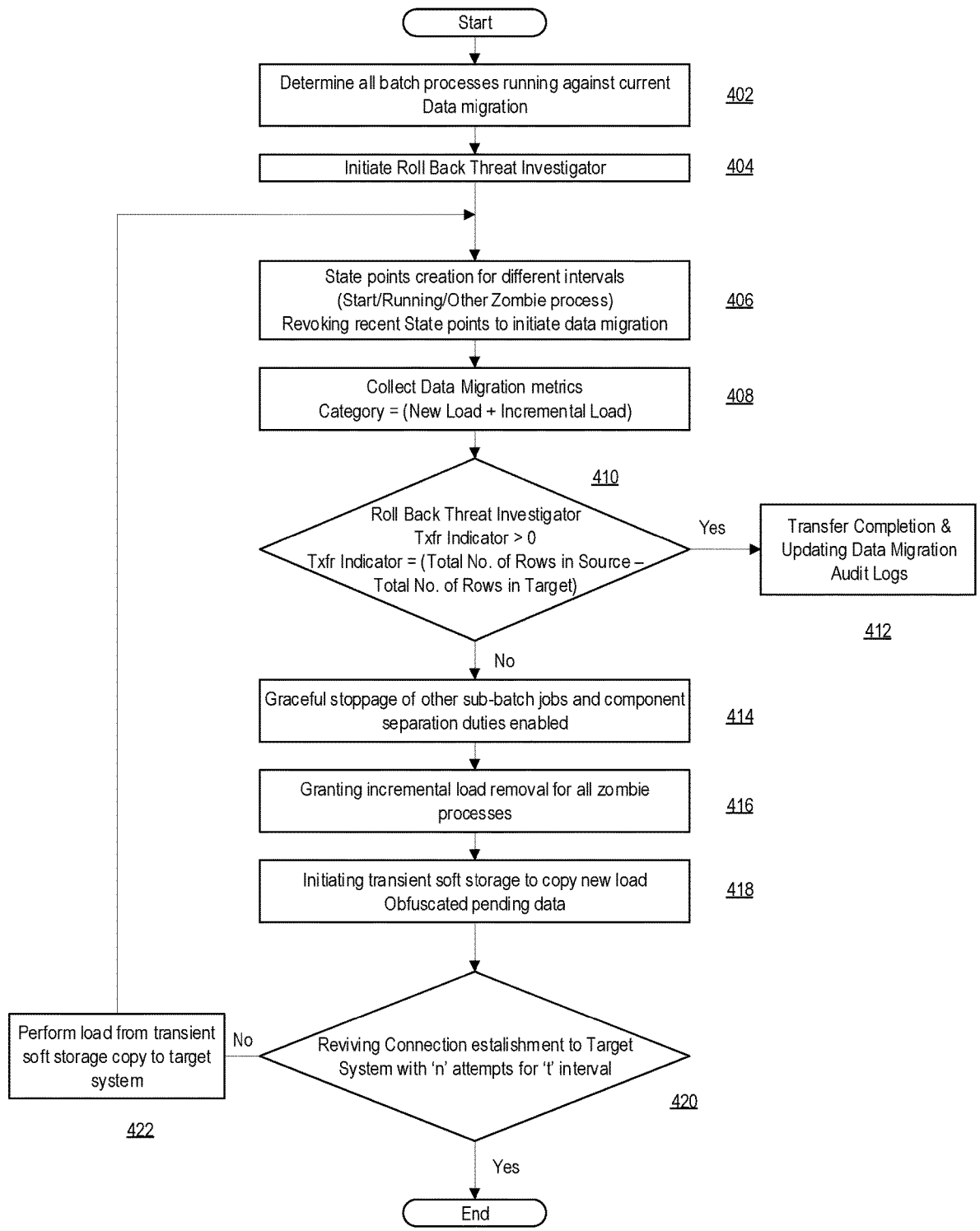
FIG. 4 depicts an illustrative method for fallback controlling in accordance with one or more example embodiments.

From a pseudo code perspective, sample hyper fencing could be considered as follows.
1. Determine Total Compressed File size available for Process File size=Sum of (Uncompressed file per partitions size)
2. Finding type of Compression codec applied over the data io.compression.codec(gzip/lz4/lzf/snappy) getCodecName(conf: ValConf): String
3. Uncompressing the data form factor sqlContext.setConf ("sql.parquet.compression.codec", "uncompressed")
4. Splitting into 'n' data chunks up to 128 MB from the uncompressed files N=1 task per input split FIG. 4 depicts an illustrative method for fallback controlling in accordance with one or more example embodiments. Fallback controlling is the use of heuristic process(es) deployed to specify a graceful stopping point and separation of duties from the respective process against one or more obfuscation/transfer processing components. Heuristic methods can be used to speed up the process of finding a satisfactory solution. Heuristics can be shortcuts that ease the technical cognitive load of making a decision. These services engage roll back protocols and reinstate the framework by ceasing batch jobs that are in progress and reducing the target system downtime. Any critical stoppage due to the disparate sources can be handled and mitigated. Accordingly, in step 402, a determination is made of all batch processes running against current data migration. In step 404, a roll back threat investigator can be initiated.

In step 406, state points for jobs or the like can be created at progressive time intervals through a task process. Each prior state point can be revoked as time progresses as task steps are completed in order to facilitate data migration. State points, which contain reliable data content at certain points in time, are responsible for updating any movement in new data or updated data while migrating from memory such as, for example, a RAM buffer cache, to the target location and/or lower lanes as the job is divided from a long transaction into smaller parts. State point data can be created at different time intervals with corresponding time stamp data sizes and user ids while denoting the relevant processes such as (Start/Running/On-Hold/Completed). State point data keeps the buffer cache or the like and corresponding datafiles synchronized. This synchronization is part of the mechanism which ensures that data can be recovered due to any process fault. It is also an important activity which can record system change(s) so that data blocks less than or equal to the state point data are known to be written out to the data files after initiating the recovery process. If there is a failure and then subsequent cache recovery, only the redo records containing changes at higher than the state point data need to be applied during recovery. This obviates the need to re-compute entire tasks or jobs, and thereby substantially increases system performance.

In step 408, data migration metrics can be collected. Each category could include the new load and the incremental load. Data migration in this context is the process of selecting, extracting, applying obfuscation rules and masking data by transferring from upper lanes (e.g., production platforms) to lower lanes (e.g., development regions, system integration testing regions, user acceptance testing regions, application vulnerability testing regions, etc.). After a fault, the residual or left out data that was processed can be transferred from memory, such as a RAM buffer, to the respective target location. However, if a target location becomes inaccessible, then the buffer data can be kept in the dedicated soft storage (i.e., temporary storage area for data with its last state point) and copied into target location once the servers are back online.

Data migration metrics can be collected through audit logs, which can save some or all of the records for an event that is transpiring in the system. In addition to saving what resources were accessed, audit log entries can also include destination and source addresses, timestamps, and user login information. They can be stored in the table (row/column) format or the like, which can be examined through earlier job submissions and its base metrics that can include the size of the data, RAM allocated, Disk I/O, storage memory, cache memory, and Java virtual machine memory or the like.

Full and new load information can be a set of all new data inserted from initiation, whereas the incremental load can be a set of new records and updated ones inserted to the existing data and can be determined by updated timestamp fields. The main attributes for calculating the load are checksum and timestamp fields. Checksums are typically used to compare two sets of data to make sure they are the same. It is a sum that checks the validity of data. A timestamp field or the like is a sequence of characters when a certain event occurred, with date and time of day, and can be accurate to a small fraction of a second.

In step 410, the roll back threat investigator can evaluate a transfer indicator count, which could be the total number of rows in a source minus the total number of rows in a target. If the transfer indicator is greater than zero, then, the transfer is complete and data migration audit logs can be updated in step 412. If the transfer indicator is not greater than zero, then a fault has occurred and, in step 414, other sub-batch jobs can be gracefully and safely stopped, and component separation duties can be enabled. The roll back threat investigator can be a daemon or thread process which does periodic checking for time interval "t" on the job state if it had any termination. Post termination it takes care of applying the roll back protocols and softening the stoppage gracefully.

In step 416, loads for various applicable processes can be incrementally removed. This is the deletion of some or all of everything that occurred after the last applicable state point. Stated differently, incremental versions that are redundant as identified by the state point data can be removed in whole or part. This enhances obfuscated data life cycle management to prevent data deletion. This means that there is no data deletion for everything up to the state point. It protects valid data from deletion from memory such as, for example, in a RAM buffer cache, and reduces further processing efforts, since the task does not need to be performed again from the beginning in its entirety.

In step 418, transient soft storage (i.e., temporary volatile memory) can be utilized to copy the new load with obfuscated pending data. In step 420, the connection establishment to target system can be revived with a number of attempts for each time interval. If revival was not successful, the load from the transient soft storage copy to the target system can be performed in step 422, and state points could be created again in step 406. Otherwise, the fallback process can complete.

From a pseudo code perspective, sample fallback control could be considered as follows.
1. Identify all batch processes running against current Data migration.
2. Initiate Roll Back Threat Investigator 3. State Point creation for different intervals (Start/Running/Other Zombie process) Revoking recent State Points to initiate data migration
4. Collect Data Migration metrics Category=(New Load+Incremental Load)
5. Roll Back Threat Investigator Txfr Indicator>0

Txfr Indicator=(Total No. of Rows in Source−Total No. of rows in Target)

Figure 5:
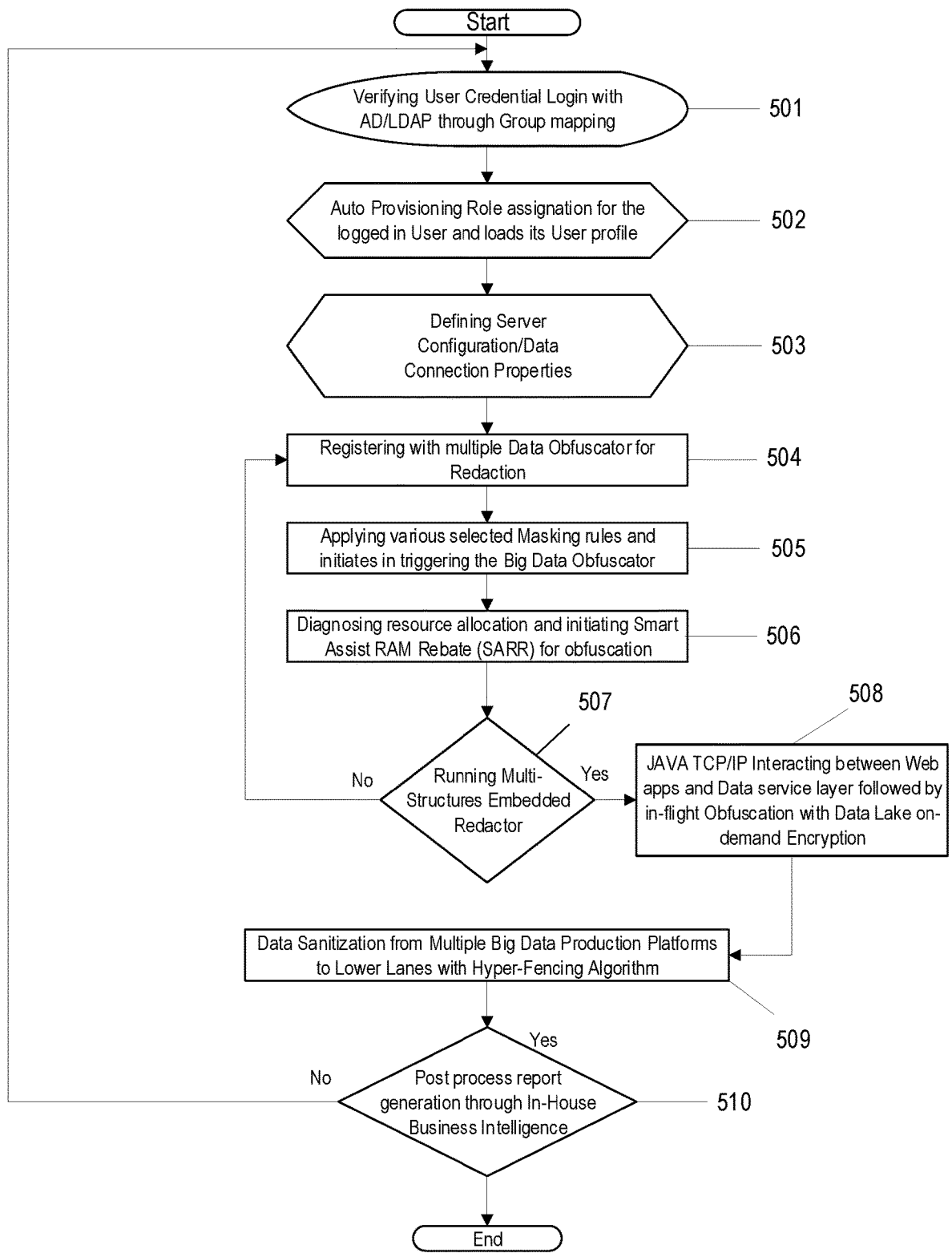
FIGS. 5 and 6 depict illustrative methods for resource allocation and rebating in accordance with one or more example embodiments.
Figure 6:
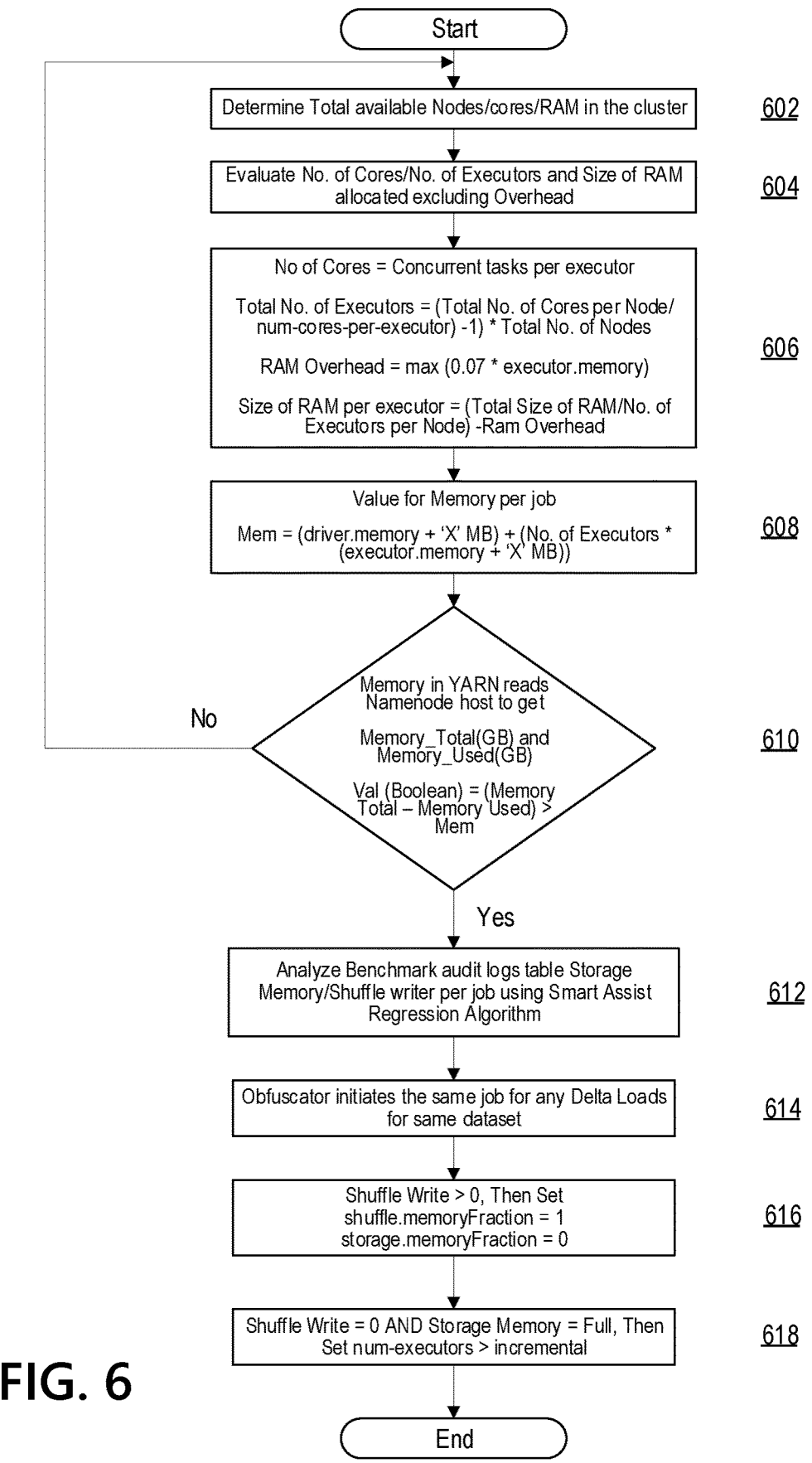

6. Transfer Completion & Updating Data Migration Audit Logs
7. —If No, Graceful stoppage of other sub-batch jobs and component separation duties enabled
8. —If Yes,
    (a) Granting incremental load removal from zombie processes
    (b) Initiating transient soft storage to copy new load Obfuscated pending data
    (c) Reviving Connection establishment to Target System to load transient soft storage copy FIGS. 5 and 6 depict illustrative methods for resource allocation and rebating in accordance with one or more example embodiments. As can be seen by the names of the various steps in FIGS. 2 and 5, many of the steps correspond to one another and are not repeated herein for brevity. These steps include verifying user credentials 201/501, auto provisioning 202/502, defining server configurations 203/503, registering with multiple data obfuscators for redaction 204/504, applying various selected masking rules 205/505, diagnosing resource allocations and rebates 206/506, running multi-structures embedded redactor 208/507, Java or the like TCP/IP interactions 210/508, data sanitization 211/509, and post process report generation 212/510. However, in FIG. 5, after the multi-structures embedded redactor is running and monitoring the progress of various jobs or tasks at frequent intervals such as, for example, every 10 milliseconds, the process returns to step 504 in the event of a negative output.

In FIG. 6, resource allocation and rebate processes first determine in step 602 the total available nodes, cores, and RAM in a cluster. In step 604, the number of cores and/or executors and size of RAM allocated, excluding overhead, is evaluated.

In step 606, the number of cores can be determined to be the number of current tasks assigned per executor. The total number of executors can be determined to be equal to the total number of cores per node divided by the number of cores-per-executor, minus 1, multiplied by the total number of nodes. The RAM overhead can be determined to be the maximum RAM multiplied by 7% (or another suitable percentage) multiplied by the executor memory. The size of RAM per executor can be calculated to be the total size of the RAM divided by the number of executors per node, minus the RAM overhead.

In step 608, the value for the memory per job can be determined. "Mem" can be calculated to be the driver memory plus "X" MB plus the product of the number of executors multiplied by the sum of the executor memory plus "X" MB.

In step 610, the memory reads a namenode to determine the total memory and the memory used. The memory may be in YARN (yet another namenode) or any other resource management and job scheduling technology. A Boolean "val" variable is set to equal true if the memory total minus the memory used is greater than "Mem." If true, the process proceeds to step 612; otherwise, it returns to step 602 to repeat the analysis.

In step 612, the benchmark audit logs table is analyzed to determine storage memory and shuffle write per job modeling through a smart assist regression algorithm, which is a custom machine learning model used to predict an optimal value involved in RAM allocation and is trained based on historical records. In the model, the independent variables may include the size of the data, Disk I/O, Storage memory, Cache Memory, Java virtual machine memory, and any other applicable memory. The dependent variable will be the amount of allocated RAM. The smart assist regression is thus $Y=X1+X2+X3+X4+X5$, wherein Y is the RAM allocated, X1 is the data size, X2 is the Disk I/O, X3 is the storage, X4 is the Cache Memory, and X5 is the Java virtual machine memory.

In step 614, the obfuscator initiates the same job for any delta or incremental loads for the same dataset.

In step 616, if the shuffle write is greater than zero, then the process sets shuffle.memoryFraction to 1 and storage.memoryFraction to zero.

In step 618, if shuffle write equals zero and the storage memory is full, then the set number of executors is greater than the incremental.

Figure 7:
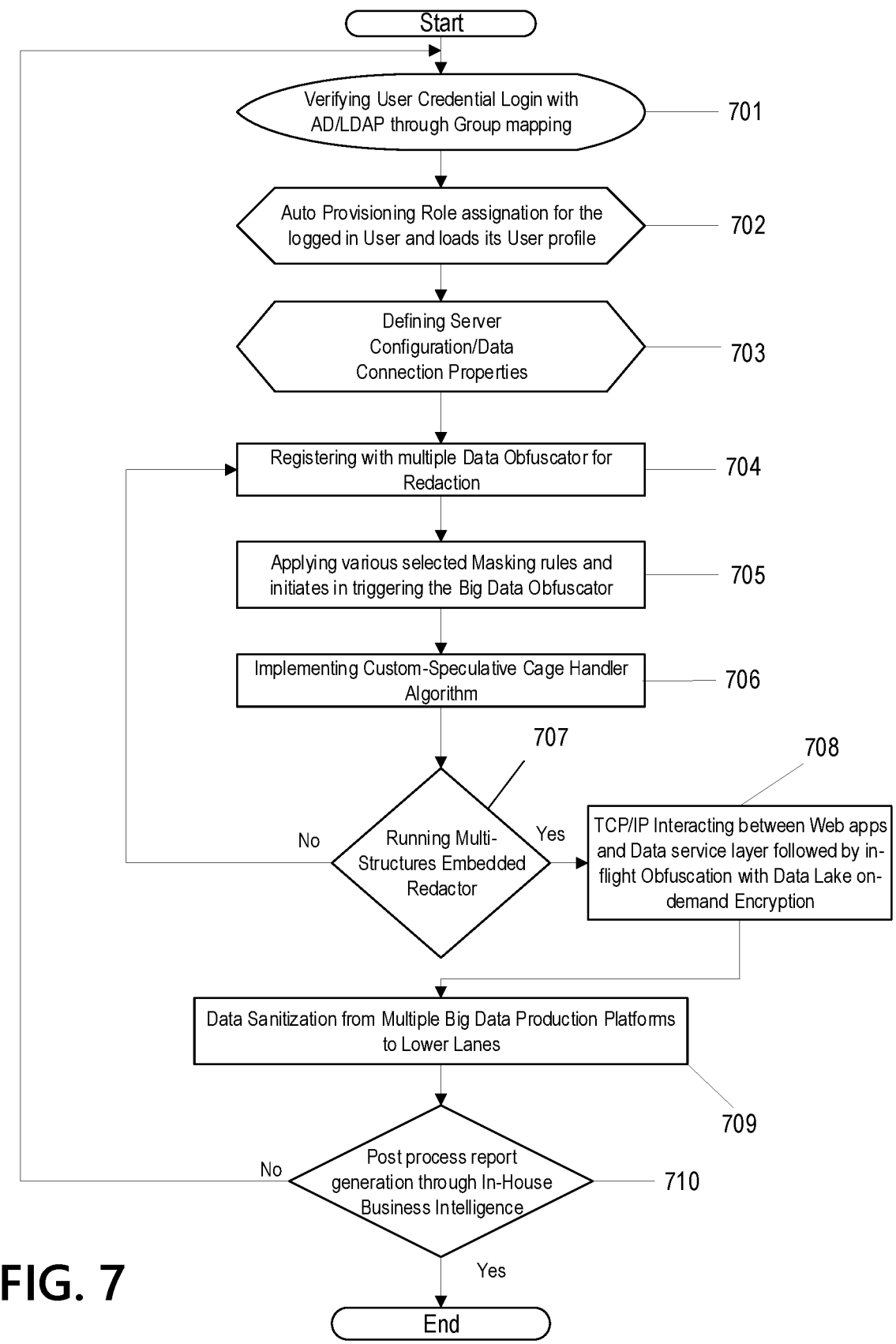
FIGS. 7 and 8 depict illustrative methods for handling faults in accordance with one or more example embodiments.
Figure 8:
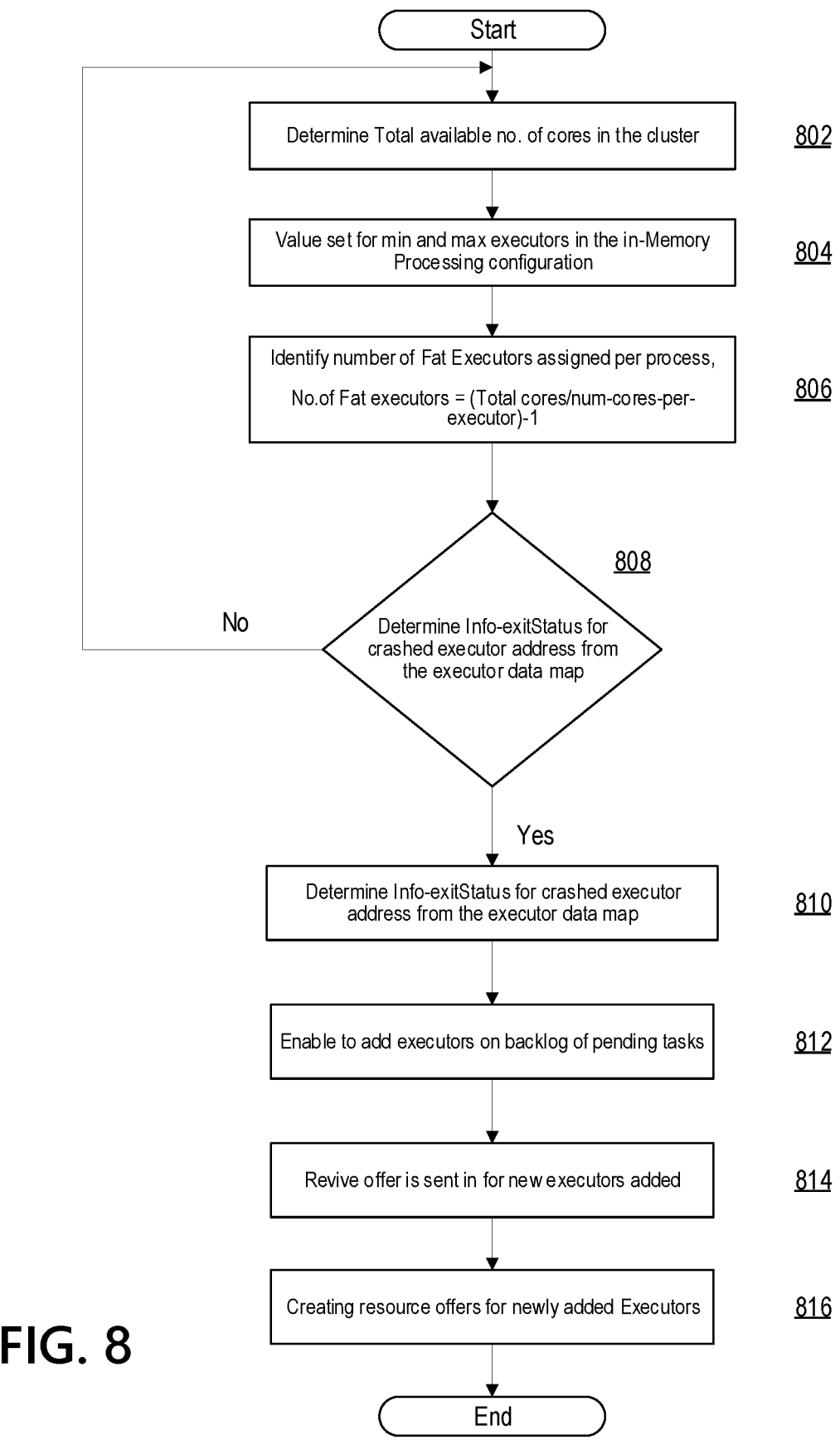

FIGS. 7 and 8 depict illustrative methods for handling faults in accordance with one or more example embodiments.

As can be seen by the names of the various steps in FIGS. 2 and 7, many of the steps correspond to one another and are not repeated herein for brevity. These steps include verifying user credentials 201/701, auto provisioning 202/702, defining server configurations 203/703, registering with multiple data obfuscators for redaction 204/704, applying various selected masking rules 205/705, running multi-structures embedded redactor 208/707, Java or the like TCP/IP interactions 210/708, data sanitization 211/709, and post process report generation 212/710. However, in FIG. 7, after the masking rules are applied and the big data obfuscator is triggered, a cage handling fault detection, isolation, and/or transferring algorithm can be implemented in step 706.

In this sample custom-speculative cage handler of step 706, the algorithm can determine the current process to cage each executor that crashed during the stages in any in-memory processing framework. This avoids future use of the caged executors by not picking them up from agent submission for upcoming tasks while performing obfuscation in units. The caging of executors may be necessary based on loss of a node. In this context, agent submission refers to the application master/manager, which reattempts to submit jobs to re-compute lost tasks from failed nodes, although there is no guarantee whether the failed nodes will be back online during the wait. The agent submission enhances low latency and improved performance as crashed executors are avoided and not reused by default speculative executors, which can be included in an in-memory processing framework.

In FIG. 8, the total number of cores in a cluster can be determined in step 802. Values can be set for the minimum and maximum executors for the in-memory processing configuration selected in step 804. The minimum and maximum executors can be determined by the values set in the configuration xml in the cluster.

In step 806, the number of fat executors assigned per process can be determined based on the total number of cores divided by the number of cores per executor, minus 1.

In this example, fat executors could be one executor per node, whereas tiny executors could be one executor per core.

In step 808, a determination is made regarding the exit status for a crashed executor address from the executor data map. If negative, the process repeats at step 802. Otherwise, if positive, the exist status is set in step 810. Here, the executor data map is a table-like structure, which holds all the list of spawned executors and data block addresses that are fed into corresponding executors for processing. When there is a crash in the executor, it can fail with an error code or exit status from which it can be identified promptly.

In step 812, the process enables the addition of executors on the backlog of pending tasks. A receive offer is sent in for new executors added in step 814, which means that new executors are summoned for the process. In step 816, resource offers for newly added executors are created.

From a pseudo code perspective, an example cage handling process can be considered as follows.
1. Determine Total available of cores in cluster
2. Value set for min and max executors
dynamicAllocation.minExecutors
dynamicAllocation.maxExecutors
3. Identify number of Fat Executors assigned per process > No. of Fat executors=(Total cores/num-cores-per-executor)−1

(Leaving 1 executor for ApplicationManager)
4. Determine Info—exitStatus for crashed executor address from the executor data map with addressTo-ExecutorId
5. Crashed Executors are gracefully decommissioned with external shuffle service
shuffle.io.maxRetries & shuffle.io.retryWait
6. Enable to add executors on backlog of pending tasks
dynamicAllocation.schedulerBacklogTimeout
7. Revive offer is sent in for new executors added
scheduler.revive.interval
8. Creating resource offers for newly added Executors
makeOffers(executorId: String): Unit One or more aspects of the disclosure may be embodied in computer-usable data or computer-executable software or instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer-executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform for fallback control during in-flight data masking and on-demand encryption of big data on a network comprising:
   a data store coupled to the network, said data store containing a big data dataset including sensitive information and non-sensitive information;
   a first computer node having:
      at least one first processor running a first set of executors;
      at least one first communication interface communicatively coupled to the at least one first processor and the network, and
      a first computer-readable medium communicatively coupled to the at least one first communication interface, the first computer-readable medium storing first computer-executable instructions that, when executed by said at least one first processor, cause the first computer node to:
         execute a first set of tasks in the first set of executors related to a request from a source for the big data dataset;

a second computer node having:
  at least one second processor running a second set of executors;
  at least one second communication interface communicatively coupled to the at least one second processor and the network, and
  a second computer-readable medium communicatively coupled to the at least one second communication interface, the second computer-readable medium storing second computer-executable instructions that, when executed by said at least one second processor, cause the second computer node to:
    execute a second set of tasks in the second set of executors related to the request from the source for the big data dataset; and
a computer cluster manager having:
  at least one cluster processor;
  at least one cluster communication interface communicatively coupled to the at least one cluster processor and the network, and
  a cluster computer-readable medium communicatively coupled to the at least one cluster communication interface, the cluster computer-readable medium storing cluster computer-executable instructions that, when executed by said at least one cluster processor, cause the computer cluster manager to:
    store a broad list of available executors that include the first set of executors in the first computer node and the second set of executors in the second computer node, said broad list of available executors stored in a first sector in the cluster computer-readable memory;
    manage the first set of executors in the first computer node;
    manage the second set of executors in the second computer node;
    receive the request for the big data dataset;
    assign one or more of said first set of executors the first set of tasks relating to the request for the big data dataset;
    assign one or more of second set of executors the second set of tasks relating to the request for the big data dataset;
    instruct that the sensitive information in the big data dataset be redacted to create a sanitized dataset that includes the redacted sensitive information and the non-sensitive information, said sanitized dataset stored in a second sector in the cluster computer-readable memory;
    detect a crashed executor in the first set of executors;
    remove said crashed executor from the broad list of available executors to create a reduced list of available executors such that the crashed executor is no longer used, said reduced list of available executors stored in the first sector in the cluster computer-readable memory;
    determine any incomplete first tasks assigned to the crashed executor;
    transfer said incomplete tasks to one of said first set of executors or said second set of executors in the reduced list of available executors;
    encrypt the sanitized dataset into encrypted data once all of said sensitive information has been redacted, said encrypted data stored in a third sector in the cluster computer-readable memory; and
    transmit the encrypted data in response to the request.

2. The computing platform of claim 1 wherein the cluster computer-readable medium contains additional instructions causing the cluster computer machine to:
  authenticate the request from the source for the big data dataset;
  auto provision a profile corresponding to the request, said profile stored in a fourth sector in the cluster computer-readable memory;
  assign access rights for the request based on the profile;
  define server configuration and data connection instructions for the data store containing the big data dataset;
  securely connect the cluster computer machine to the data store via the cluster communication interface based on the server configuration and the data connection instructions;
  register at least one multiple data obfuscation type;
  load the big data dataset from the data store into the cluster computer-readable memory via the cluster communication interface, said big data dataset stored in a fifth sector in the cluster computer-readable memory; and
  distribute the big data dataset to the first computer node and the second computer node as part of the first set of first tasks and the second set of second tasks.

3. The computing platform of claim 2 wherein, upon detection of the crashed executor in the first set of executors, all said first executors in the first computer node are removed from the broad list of available executors.

4. The computing platform of claim 2 wherein the encryption is performed using data lake encryption.

5. The computing platform of claim 2 wherein the encryption is performed using a Base64 algorithm.

6. The computing platform of claim 2 wherein the encryption is performed using a text-to-binary scheme.

7. The computing platform of claim 2 wherein the sensitive information is redacted using a pre-defined mask.

8. The computing platform of claim 2 wherein the sensitive information is redacted using random generation.

9. The computing platform of claim 2 wherein the sensitive information is redacted using regular expression obfuscation.

10. The computing platform of claim 9 wherein the regular expression obfuscation is used to capture pattern values and replace the pattern values with a replacing value format.

11. The computing platform of claim 2 wherein the cluster computer-readable medium contains report instructions causing the cluster computer machine to generate a post process performance report.

12. The computing platform of claim 11 wherein the post process performance report is an obfuscation summary report.

13. The computing platform of claim 11 wherein the post process performance report is a data forensics summary report.

14. The computing platform of claim 11 wherein the post process performance report is a data processing summary report.

15. The computing platform of claim 2 wherein the cluster computer-readable medium contains state saving instructions causing the cluster computer machine to save a safe state setpoint to determine a last safe state reached before detection of the crashed executor so that only an uncompleted portion of the incomplete tasks are further processed.

16. A computer-implemented method of fault handling during in-flight data masking and on-demand encryption of big data on a network comprising the steps of:

authenticating, by an obfuscation computer machine, a request for a big data dataset based on credentials received from a source,
- said obfuscation computer machine coupled to the network,
- said obfuscation computer machine containing computer-readable memory,
- said computer-readable memory including a list of executors available for processing the big data dataset, said list of available executors stored in a first sector of the computer-readable memory;
- said request stored in a second sector of the computer-readable memory;
- said big data dataset stored in a data store coupled to the network, said big data dataset including sensitive information and non-sensitive information;

auto provisioning, by the obfuscation computer machine, a profile corresponding to the request, said profile stored in a third sector of the computer-readable memory;

assigning, by the obfuscation computer machine, access rights for the request based on the profile, said access rights stored in a fourth sector of the computer-readable memory;

defining, by the obfuscation computer machine, server configuration and data connection properties for the data store containing the big data dataset, said server configuration and said data connection properties stored in a fifth sector of computer-readable memory;

establishing, by the obfuscation computer machine, a secure connection from the obfuscation computer machine to the data store based on the server connection and the data connection properties;

registering, by the obfuscation computer machine, at least one multiple data obfuscation type stored in a sixth sector of computer-readable memory;

loading, by the obfuscation computer machine into a seventh sector of computer-readable memory, the big data dataset from the data store on the network;

searching, by the obfuscation computer machine, the big data dataset for the sensitive information to be redacted;

redacting into a sanitized dataset, by the obfuscation computer machine, the sensitive information in the big data dataset based on said at least one multiple data obfuscation type and the non-sensitive information;

storing, by the obfuscation computer machine into an eighth sector of computer-readable memory, the sanitized dataset;

detecting, by the obfuscation computer machine, a crashed executor that crashed during any processing of the big data dataset;

removing, by the obfuscation computer machine, the crashed executor from the list of available executors to create a list of non-crashed executors, said list of non-crashed executors stored in the first sector of the computer-readable memory;

resubmitting, by the obfuscation computer machine, an uncompleted task assigned to the crashed executor to one of said non-crashed executors;

encrypting, by the obfuscation computer machine, the sanitized dataset into encrypted data, said encrypted data stored in a ninth sector of computer-readable memory; and transmitting, by the obfuscation computer machine, the encrypted data in response to the request.

17. The computer-implemented method of fault handling of claim 16 wherein the obfuscation computer machine is a cluster manager.

18. The computer-implemented method of fault handling of claim 17 further comprising the step of: managing, by the obfuscation computer machine, a first computer node and a second computer node, wherein the first computer node contains first group of first executors and the second computer node contains a second group of second executors.

19. The computer-implemented method of fault handling of claim 18 wherein said crashed executor is one of said first executors.

20. A non-transitory computer-readable medium with computer-executable instructions stored thereon executed by a processor on a computer machine for fault handling during in-flight data masking and on-demand encryption of a big data dataset stored in a data store on a network, said big data dataset including sensitive information and non-sensitive information, said computer machine communicatively coupled to the network, comprising:
- authentication instructions to authenticate a request for the big data dataset based on credentials received from a source;
- auto provision instructions to identify a profile corresponding to the request, said profile stored in a first sector of the computer-readable medium;
- access instructions to assign access rights for the request based on the profile, said access rights stored in a second sector of the computer-readable medium;
- server configuration and data connection instructions to define connection properties for the data store containing the big data dataset, said server configuration and said data connection properties stored in a third sector of the computer-readable medium;
- secure connection instructions to establish a secure connection from the computer machine to the data store based on the server connection and the data connection properties;
- registration instructions to register at least one multiple data obfuscation type stored in a fourth sector of the computer-readable medium;
- load instructions to load the big data dataset from the data store on the network into a fifth sector of the computer-readable medium;
- search instructions to search the big data dataset for the sensitive information to be redacted;
- redaction instructions to redact into a sanitized dataset the sensitive information in the big data dataset based on said at least one multiple data obfuscation type and the non-sensitive information;
- diagnosing instructions to identify RAM requirements and a current RAM allocation;
- rebate instructions to rebate a portion of the current RAM allocation that exceeds the RAM requirements;
- detection instructions to detect a crashed executor;
- remove instructions to remove the crashed executor from a broad list of available executors to create a reduced list of available executors such that the crashed executor is no longer used;
- identification instructions to identify any incomplete tasks assigned to the crashed executor;
- transfer instructions to transfer said incomplete tasks to an available executor in the reduced list of available executors;
- storage instructions to store the sanitized dataset into a sixth sector of the computer-readable medium;

encryption instructions to encrypt the sanitized dataset into encrypted data, said encrypted data stored in a seventh sector of the computer-readable medium; and
transmission instructions to transmit the encrypted data in response to the request.

\* \* \* \* \*